US008754880B2

(12) United States Patent
Ishiguro et al.

(10) Patent No.: US 8,754,880 B2
(45) Date of Patent: Jun. 17, 2014

(54) PIXEL CIRCUIT DRIVING METHOD, LIGHT EMITTING DEVICE, AND ELECTRONIC APPARATUS

(75) Inventors: Hideto Ishiguro, Suwa (JP); Satoshi Yatabe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 540 days.

(21) Appl. No.: 12/512,536

(22) Filed: Jul. 30, 2009

(65) Prior Publication Data

US 2010/0079433 A1 Apr. 1, 2010

(30) Foreign Application Priority Data

Sep. 29, 2008 (JP) ................................ 2008-249811

(51) Int. Cl.
*G06F 3/038* (2013.01)
*G09G 5/00* (2006.01)

(52) U.S. Cl.
USPC .......................................................... 345/211

(58) Field of Classification Search
USPC .......................................................... 345/211
See application file for complete search history.

(56) References Cited

U.S. PATENT DOCUMENTS 7,834,826 B2 11/2010 Kwon
2003/0142048 A1* 7/2003 Nishitani et al. ................ 345/82
2005/0200584 A1* 9/2005 Kudo et al. ..................... 345/89
2007/0132696 A1* 6/2007 Yamashita ...................... 345/98
2007/0268210 A1* 11/2007 Uchino et al. ................. 345/55
2008/0186295 A1* 8/2008 Choi ............................ 345/208

FOREIGN PATENT DOCUMENTS

CN A-101030353 9/2007
JP A-2007-310311 11/2007
JP A-2008-185874 8/2008

* cited by examiner

*Primary Examiner* — Quan-Zhen Wang
*Assistant Examiner* — Nelson D Runkle, III
(74) *Attorney, Agent, or Firm* — Oliff PLC

(57) ABSTRACT

Provided is a method of driving a pixel circuit including a light emitting element and a driving transistor which are connected in series to each other, and a storage capacitor disposed between a path between the light emitting element and the driving transistor and a gate of the driving transistor, the method including the steps of: supplying a driving signal to a gate of the driving transistor; and changing the potential of the driving signal over time so that the time rate of change of the potential of the driving signal at the point in time when the supply of the driving signal stops becomes the time rate of change corresponding to a specified gradation of the pixel circuit.

12 Claims, 24 Drawing Sheets

PIXEL CIRCUIT DRIVING METHOD, LIGHT EMITTING DEVICE, AND ELECTRONIC APPARATUS

This application claims priority to Japanese Application No. 2008-249811 filed in Japan on Sep. 29, 2008, the disclosure of which is hereby incorporated by reference in its entirety.

BACKGROUND

1. Technical Field

The present invention relates to a technique for driving light emitting elements such as organic electroluminescent (EL) elements.

2. Related Art

In light emitting devices in which a driving current supplied to a light emitting element is controlled by a driving transistor, electrical characteristic variations (deviations from target values or variations between elements) of the driving transistor become an issue. JP-A-2007-310311 discloses a technique of setting a gate-source voltage of a driving transistor to a threshold voltage of the driving transistor and then changing the gate-source voltage to a voltage corresponding to a gradation, thereby compensating for the variations (and accordingly, the variations in the amount of the driving current) in the threshold voltage and the mobility of the driving transistor.

However, the effective compensation of the variations in the driving current by the technique disclosed in JP-A-2007-310311 is limited to cases where a specific gradation is specified, and depending on the gradations, in some cases, the variations in the driving current cannot be corrected.

SUMMARY

An advantage of some aspects of the invention is that it provides a technique for suppressing the variations in a driving current with respect to a plurality of gradations.

According to some aspects of the invention, there is provided a method of driving a pixel circuit including a light emitting element and a driving transistor which are connected in series to each other, and a storage capacitor disposed between a path between the light emitting element and the driving transistor and a gate of the driving transistor, the method including the steps of: supplying a driving signal to a gate of the driving transistor; and changing the potential of the driving signal over time so that the time rate of change of the potential of the driving signal at the point in time when the supply of the driving signal stops becomes the time rate of change corresponding to a specified gradation of the pixel circuit.

When the driving signal is supplied to the gate of the driving transistor, a current (a current independent of the threshold voltage or the mobility of the driving transistor) corresponding to the time rate of change of the potential of the driving signal flows through the driving transistor. The open circuit voltage of the storage capacitor is set to a voltage capable of allowing the current corresponding to the time rate of change of the potential of the driving signal at the point in time when the supply of the driving signal to the gate of the driving transistor stops to flow through the driving transistor. More specifically, the open circuit voltage of the storage capacitor is set to allow a current corresponding to a multiplication of the time rate of change of the potential of the driving signal at the point in time when the supply of the driving signal to the gate of the driving transistor stops, with the capacitance of a capacitor associated with the path between the light emitting element and the driving transistor, to flow through the driving transistor. The time rate of change at the point in time when the supply of the driving signal stops is set to be variable in accordance with the specified gradation of the pixel circuit. Therefore, the driving current supplied to the light emitting element in response to the open circuit voltage of the storage capacitor is set to a current amount (a current amount independent of the threshold voltage or the mobility of the driving transistor) corresponding to the specified gradation. Here, the time rate of change of potential means the rate of change in potential with the passing of time and has the same meaning as the gradient of potential with respect to a time axis or a time derivative of potential.

According to a preferred aspect of the invention, the potential of the driving signal is changed with the constant time rate of change corresponding to the specified gradation during a predetermined period of time until the point in time when the supply of the driving signal to the gate of the driving transistor stops. In the above-mentioned aspect, since the time rate of change of the potential of the driving signal is maintained at a predetermined value during the predetermined period of time, the time rate of change of the potential of the driving signal can be accurately set to the time rate of change corresponding to the specified gradation at the point in time when the supply of the driving signal stops.

According to a first aspect of the invention, the pixel circuit includes a select switch disposed between a signal line to which the driving signal is supplied and the gate of the driving transistor, and the select switch is controlled to be in an ON state in response to the supply of a selection pulse, so that the driving signal is supplied from the signal line to the gate of the driving transistor.

According to a specific embodiment of the first aspect, at least when the specified gradation is a first gradation (for example, the minimum gradation DMIN or the intermediate gradation DL in FIG. 12), the select switch is changed to an OFF state at the trailing edge of the selection pulse, so that the supply of the driving signal to the gate of the driving transistor stops. In the above-mentioned aspect, it is possible to provide an advantage that, when the first gradation is specified, the point in time when the supply of the driving signal to the gate of the driving transistor stops can be accurately defined so as to correspond to the trailing edge of the selection pulse. A specific embodiment of the above-mentioned aspect will be described in the first to fourth embodiments, for example.

According to a specific embodiment of the first aspect, at least when the specified gradation is the second gradation (for example, the maximum gradation DMAX or the intermediate gradation DH in FIG. 12), the potential of the driving signal and the potential of the selection pulse are chosen so that the difference in potential between the driving signal and the selection pulse is lower than a threshold voltage of the select switch and that the select switch enters into the OFF state at an earlier point in time than the trailing edge of the selection pulse. In the above-mentioned aspect, when the difference in potential between the driving signal and the selection pulse is lower than the threshold voltage of the select switch, the select switch transitions to the OFF state at an earlier point in time than the trailing edge of the selection pulse. Therefore, compared with the method in which the supply of the driving signal stops at the trailing edge of the selection pulse independent of the specified gradation, it is possible to suppress the amplitude of the selection pulse or the driving signal even when the potential of the driving signal is changed with a higher time rate of change. A specific embodiment of the above-mentioned aspect will be described in the second embodiment, for example.

According to a specific embodiment of the first aspect, the potential of the driving signal starts to be changed with the time rate of change corresponding to the specified gradation at the point in time after the passing of an adjustment time from the leading edge of the selection pulse. According to the above-mentioned aspect, compared with the method in which the potential of the driving signal starts to be changed at the leading edge of the selection pulse independent of the specified gradation, for example, it is possible to suppress the amplitude of the selection pulse or the driving signal. Considering the tendency that the period of time elapsed until the time rate of change of the source potential of the driving transistor reaches an equilibrium state where it becomes identical to the time rate of change of the potential of the driving signal changes in accordance with the time rate of change of the potential of the driving signal, it is particularly desirable to use a method of setting the adjustment time to be variable in accordance with the specified gradation. A specific embodiment of the above-mentioned aspect will be described in the third embodiment, for example.

According to a specific embodiment of the first aspect, the potential of the driving signal is changed with the time rate of change corresponding to the specified gradation after the potential is changed to an adjustment potential corresponding to the specified gradation. In the above-mentioned aspect, since the potential of the driving signal starts to be changed to the time rate of change corresponding to the specified gradation after the potential is changed to the adjustment potential, it is possible to provide an advantage that the period of time (the period of time elapsed until the driving transistor reaches an equilibrium state) until a current starts flowing through the driving transistor can be reduced. A specific embodiment of the above-mentioned aspect will be described in the fourth embodiment, for example.

In the pixel circuit driving method according to a second aspect of the invention, the driving signal is supplied to the gate of the driving transistor after the open circuit voltage of the storage capacitor is initialized. In the above-mentioned configuration, since the open circuit voltage of the storage capacitor is initialized, when the potential of the driving signal is changed to the time rate of change corresponding to the specified gradation, the drain-source current of the driving transistor begins to flow immediately. Therefore, compared with the case where the open circuit voltage of the storage capacitor is not initialized, it is possible to reduce the period of time elapsed until the driving transistor reaches the equilibrium state.

According to a specific embodiment of the second aspect, the open circuit voltage of the storage capacitor is initialized to a voltage at which the driving transistor enters into an ON state. In the above-mentioned aspect, since the driving transistor is controlled to be in the ON state by the initialization of the open circuit voltage of the storage capacitor, the drain-source current of the driving transistor begins to flow immediately after the supply of the driving signal is started, independent of the open circuit voltage of the storage capacitor before the initialization. A specific embodiment of the above-mentioned aspect will be described in the fifth to seventh embodiments, for example.

According to a specific embodiment of the second aspect, when the driving signal of which the potential varies with a predetermined time rate of change (for example, a time rate of change corresponding to the maximum gradation) is supplied to the gate of the driving transistor, the open circuit voltage of the storage capacitor is initialized to a voltage at which the driving transistor enters into an ON state. In the above-mentioned aspect, it is possible to provide an advantage that the open circuit voltage of the storage capacitor can be initialized by the same operation as at the time of driving the pixel circuit. A specific embodiment of the above-mentioned aspect will be described as in the fifth embodiment, for example.

According to a specific embodiment of the second embodiment, when a reference potential is supplied from a signal line for the supply of the driving signal to the gate of the driving transistor while a predetermined potential is supplied from a power supply line to the path between the light emitting element and the driving transistor, the open circuit voltage of the storage capacitor is initialized to a voltage at which the driving transistor enters into an ON state. In the above-mentioned aspect, since the reference potential is supplied to the gate of the driving transistor while the predetermined potential is supplied to the source of the driving transistor, it is possible to provide an advantage that the open circuit voltage of the storage capacitor can be initialized with certainty to the voltage at which the driving transistor enters into the ON state. A specific embodiment of the above-mentioned aspect will be described in the sixth or seventh embodiment, for example.

According to a specific embodiment of the second embodiment, the open circuit voltage of the storage capacitor is initialized to a voltage that approaches the threshold voltage of the driving transistor. In the above-mentioned aspect, the drain-source current of the driving transistor begins to flow immediately after the supply of the driving signal is started, independent of the open circuit voltage of the storage capacitor before the initialization. A specific embodiment of the above-mentioned aspect will be described in the eighth to tenth embodiments, for example.

According to a third aspect which is a preferred specific embodiment of the second aspect, each of a plurality of pixel circuits arranged so as to correspond to intersections of the signal lines and a plurality of scanning lines includes a select switch which is disposed between the signal line and the gate of the driving transistor and enters into an ON state when the scanning line is selected, and is configured to initialize the open circuit voltage of a storage capacitor in each of the plurality of pixel circuits and sequentially select each of the plurality of scanning lines for each unit time period, thereby changing the potential of the driving signal over time for each unit time period so that the time rate of change of the potential of the driving signal at the point in time when the select switch of the pixel circuit corresponding to the selected scanning line transitions to an OFF state becomes the time rate of change corresponding to the specified gradation of the pixel circuit.

According to a specific embodiment of the third aspect, in an initialization period within the unit time period for selecting the scanning line that occurs before the driving signal is varied with the time rate of change corresponding to the specified gradation, the driving signal supplied to the signal line is set to the reference potential, and the driving transistor is controlled to be in the ON state, whereby the open circuit voltage of the storage capacitor is initialized to a voltage approaching the threshold voltage of the driving transistor. In the above-mentioned aspect, since the signal line for supplying the driving signal is also used for the initialization of the open circuit voltage of the storage capacitor, it is possible to provide an advantage that the configuration of the pixel circuit can be simplified compared with a method where a line which is solely used for the initialization of the open circuit voltage of the storage capacitor is necessary. A specific embodiment of the above-mentioned aspect will be described in the eighth embodiment, for example.

According to a specific embodiment of the third aspect, the open circuit voltage of the storage capacitor of each of the pixel circuits corresponding to the respective scanning lines is initialized to approach the threshold voltage of the driving transistor of the corresponding pixel circuit over two or more unit time periods occurring before the start of the unit time period for selecting the corresponding scanning line. In the above-mentioned aspect, since the operation of causing the open circuit voltage of the storage capacitor to approach the threshold voltage of the driving transistor is executed over two or more unit time periods, it is possible to cause the open circuit voltage of the storage capacitor to approach sufficiently close to the threshold voltage of the driving transistor, compared with a method where the open circuit voltage of the storage capacitor is caused to approach the threshold voltage within the unit time period for selecting the scanning line.

As a method of causing the open circuit voltage of the storage capacitor to approach the threshold voltage of the driving transistor over two or more unit time periods, for example, a method may be preferably used in which each of a plurality of unit time periods include a first period and a second period, each of the plurality of scanning lines is selected during a second period of the unit time period corresponding to the scanning line within the plurality of unit time periods and during two or more first periods before the second period begins, the potential of the driving signal is varied over time for every unit time period so that the time rate of change of the potential of the driving signal at the point in time, at which the select switch of the pixel circuit corresponding to the scanning line selected during the second period transitions to the OFF state, becomes the time rate of change corresponding to the specified gradation of the pixel circuit, and during the two or more first periods, the driving signal supplied to the signal line is set to the reference potential and the driving transistor is controlled to be in the ON state, whereby the open circuit voltage of the storage capacitor is caused to approach the threshold voltage of the driving transistor. In the above-mentioned aspect, since the signal line for supplying the driving signal is also used for the initialization of the open circuit voltage of the storage capacitor, it is possible to provide an advantage that the configuration of the pixel circuit can be simplified compared with a method where a line which is solely used for the initialization of the open circuit voltage of the storage capacitor is necessary. In the invention, the order and the ratio of the first period and the second period are arbitrary. A specific embodiment of the above-mentioned aspect will be described in the ninth embodiment, for example.

As a method of causing the open circuit voltage of the storage capacitor to approach the threshold voltage of the driving transistor over two or more unit time periods, for example, a method may be preferably used in which over two or more unit time periods before the unit time periods for selecting the respective scanning lines begin, the reference potential is supplied from the power supply line to the gate of the driving transistor of the pixel circuit corresponding to the scanning line, and the driving transistor is controlled to be in the ON state, whereby the open circuit voltage of the storage capacitor is caused to approach the threshold voltage of the driving transistor In the above-mentioned aspect, since the entire periods of the two or more unit time periods are used for the initialization of the open circuit voltage of the storage capacitor, it is possible to provide an advantage that the number of unit time periods required for causing the open circuit voltage of the storage capacitor to approach sufficiently close to the threshold voltage of the driving transistor can be reduced. A specific embodiment of the above-mentioned aspect will be described in the tenth embodiment, for example.

The invention is also specified as a light emitting device. The light emitting device according to the invention includes a pixel circuit including a light emitting element and a driving transistor which are connected in series to each other, and a storage capacitor disposed between a path between the light emitting element and the driving transistor and a gate of the driving transistor; and a driving circuit configured to drive the pixel circuit by the driving method according to the above-mentioned aspects. According to the light emitting device having such a configuration, the same operation and the same advantages as those of the driving method according to the invention can be realized.

The light emitting device according to the invention is used in various electronic apparatuses. A typical example of the electronic apparatus is an apparatus that uses the light emitting device as a display device. An example of the electronic apparatus according to the invention includes a personal computer and a cellular phone. The application of the light emitting device according to the invention is not limited to displaying of an image. For example, the light emitting device according to the invention may be applied to an exposure device (optical head) for forming latent images on an image carrier such as a photosensitive drum by irradiation of light beams.

BRIEF DESCRIPTION OF THE DRAWINGS

The invention will be described with reference to the accompanying drawings, wherein like numbers reference like elements.

DETAILED DESCRIPTION OF EMBODIMENTS

A: Driving Principle

Figure 1:
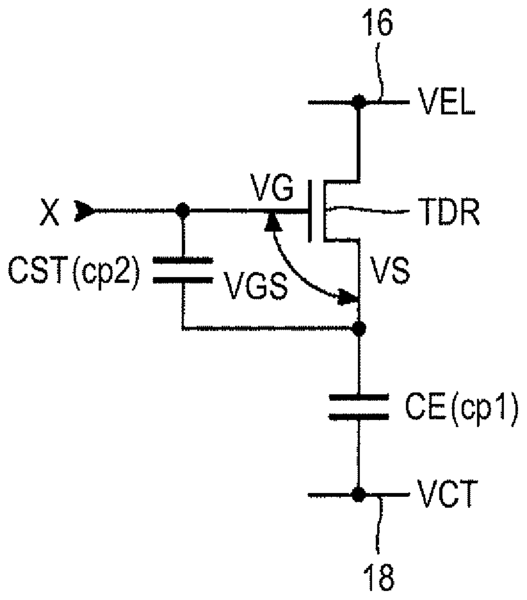
FIG. 1 is a circuit diagram for explaining the driving principle of a pixel circuit.

The principle used in driving the pixel circuit in each embodiment will be described prior to description of specific embodiments of the invention. As illustrated in FIG. 1, a circuit in which an N-channel driving transistor TDR and a capacitor CE (with capacitance cp1) are arranged in series on a path connecting a power supply line 16 and a power supply line 18 will be considered.

The power supply line 16 is supplied with a potential VEL, and the power supply line 18 is supplied with a potential VCT (VCT<VEL). The drain of the driving transistor TDR is connected to the power supply line 16, and the capacitor CE is disposed between the source of the driving transistor TDR and the power supply line 18. A storage capacitor CST (with capacitance cp2) is disposed between the gate and the source of the driving transistor TDR. A voltage VGS (VGS=VG−VS) which is the difference between the gate potential VG and the source potential VS of the driving transistor TDR is applied between opposite ends of the storage capacitor CST.

Figure 2:
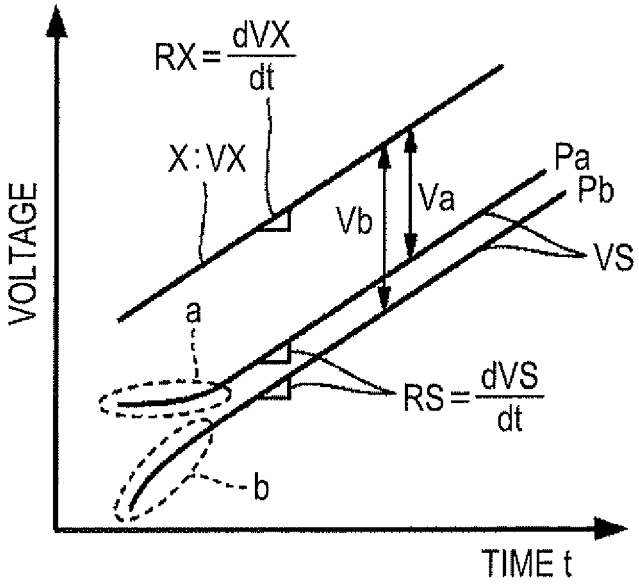
FIG. 2 is a graph for explaining the driving principle of the pixel circuit.

The gate of the driving transistor TDR is supplied with a driving signal X. The potential VX of the driving signal X varies over time as illustrated in FIG. 2. FIG. 2 illustrates a case where the potential VX rises linearly with a predetermined time rate of change RX (RX=dVX/dt). In FIG. 2, the change over time of the source potential VS is written down with respect to each case of Pa and Pb which are the electrical characteristics (for example, the mobility or the threshold voltage) of the driving transistor TDR.

When the gate potential VG (at potential VX) of the driving transistor TDR rises with the supply of the driving signal X, so that the gate-source voltage VGS of the driving transistor TDR becomes higher than the threshold voltage VTH of the driving transistor TDR, a current IDS begins to flow between the drain and the source of the driving transistor TDR. The current IDS is expressed by Equation 1 below. In Equation 1, μ is the mobility of the driving transistor TDR. Moreover, W/L is the ratio of the channel width W relative to the channel length L of the driving transistor TDR, and Cox is the capacitance per unit area of the gate insulation film of the driving transistor TDR.

$$IDS=1/2\cdot\mu W/L\cdot Cox\cdot(VGS-VTH)^2 \qquad \text{Equation 1}$$

On the other hand, since the capacitor CE and the storage capacitor CST are charged with electric charges when the current IDS begins to flow through the driving transistor TDR, the source potential VS of the driving transistor TDR varies over time with the time rate of change RS (RS=dVS/dt) as illustrated in FIG. 2. The relationship of Equation 2 below is satisfied between the current IDS and the source potential VS of the driving transistor TDR.

$$IDS=\frac{dQ}{dt}=cp2\cdot\left(\frac{dVS}{dt}-\frac{dVX}{dt}\right)+cp1\cdot\frac{dVS}{dt} \qquad \text{Equation 2}$$

In the case of the "a" portion in FIG. 2, where the time rate of change (i.e., the gradient of the potential VS with respect to the time t) RS of the source potential VS of the driving transistor TDR is lower than the time rate of change RX of the potential VX of the driving signal X, the gate-source voltage VGS of the driving transistor TDR increases over time. As is clear from Equation 1, the current IDS increases as the voltage VGS increases. In addition, as can be understood from Equation 2, the time rate of change RS also increases as the current IDS increases. That is to say, the time rate of change RS increases when the time rate of change RS is lower than the time rate of change RX.

On the other hand, in the case of the "b" portion in FIG. 2, where the time rate of change RX of the potential VX of the driving signal X is lower than the time rate of change RS of the source potential VS, the gate-source voltage VGS decreases over time. Therefore, as can be understood from Equation 1, the current IDS decreases. The time rate of change RS decreases as the current IDS decreases. That is to say, the time rate of change RS decreases when the time rate of change RS exceeds the time rate of change RX.

As described above, the time rate of change RS of the source potential VS of the driving transistor TDR approaches, over time, the time rate of change RX of the potential VX of the driving signal X and finally reaches the time rate of change RX, independent of the characteristic of the driving transistor TDR (i.e., in any of the cases involving characteristics Pa and Pb). The state (hereinafter, referred to as "equilibrium state") where the time rate of change RS is identical to the time rate of change RX can be expressed also as a state where an increase in the voltage VGS due to an increase in the potential VX of the driving signal X and a decrease in the voltage VGS due to charging with the current IDS are balanced.

In the equilibrium state, since the time rate of change RS and the time rate of change RX are identical (RS=dVS/dt=RX=dVX/dt), Equation 2 can be changed to Equation 3 below. That is to say, the current IDS flowing through the driving transistor TDR is proportional to the time rate of change RX of the potential VX of the driving signal X. More specifically, the current IDS is determined only by the capacitance cp1 of the capacitor CE and the time rate of change RX of the potential VX, but does not depend on the mobility μ or the threshold voltage VTH of the driving transistor TDR.

$$IDS = cp2\cdot\left(\frac{dVS}{dt}-\frac{dVX}{dt}\right)+cp1\cdot\frac{dVS}{dt} = cp2\cdot\left(\frac{dVX}{dt}-\frac{dVX}{dt}\right)+cp1\cdot\frac{dVX}{dt} = cp1\cdot RX \qquad \text{Equation 3}$$

The gate-source voltage VGS of the driving transistor TDR is automatically set to a voltage (i.e., the voltage VGS satisfying the relationship of Equation 1 with respect to the current IDS given by Equation 3) required to cause the current IDS to flow given by Equation 3, which is independent of the mobility μ or the threshold voltage VTH to the driving transistor TDR, in accordance with its mobility μ or threshold voltage VTH. For example, the voltage VGS is set to a voltage Va when the driving transistor TDR has the characteristic Pa in FIG. 2, while the voltage VGS is set to a voltage Vb when the driving transistor TDR has the characteristic Pb in FIG. 2. During the equilibrium state, in any of the cases with characteristics Pa and Pb, the same current IDS which depends only on the capacitance cp1 and the time rate of change RX flows through the driving transistor TDR.

The gate-source voltage VGS which is set in the above-described manner is stored in the storage capacitor CST, whereby the current IDS can continue to flow through the driving transistor TDR even after the supply of the driving signal X (at potential VX) stops. In the embodiments described below, the current IDS is used as a current (hereinafter, referred to as "driving current") IDR for driving a light emitting element. As described above with reference to Equation 3, since the current IDS does not depend on the characteristics (mobility μ or threshold voltage VTH) of the driving transistor TDR, it is possible to compensate for the variations (and the luminance variations of the light emitting element) in the driving current DR due to the characteristic variations of the driving transistor TDR. On the other hand, since the driving current IDR (current IDS) is determined by the time rate of change RX of the potential VX of the driving signal X, it is possible to set the current amount (and the luminance of the light emitting element) of the driving current IDR to be variable by controlling the time rate of change RX of the driving signal X.

B: First Embodiment

B-1: Configuration and Operation of Light Emitting Device

Figure 3:
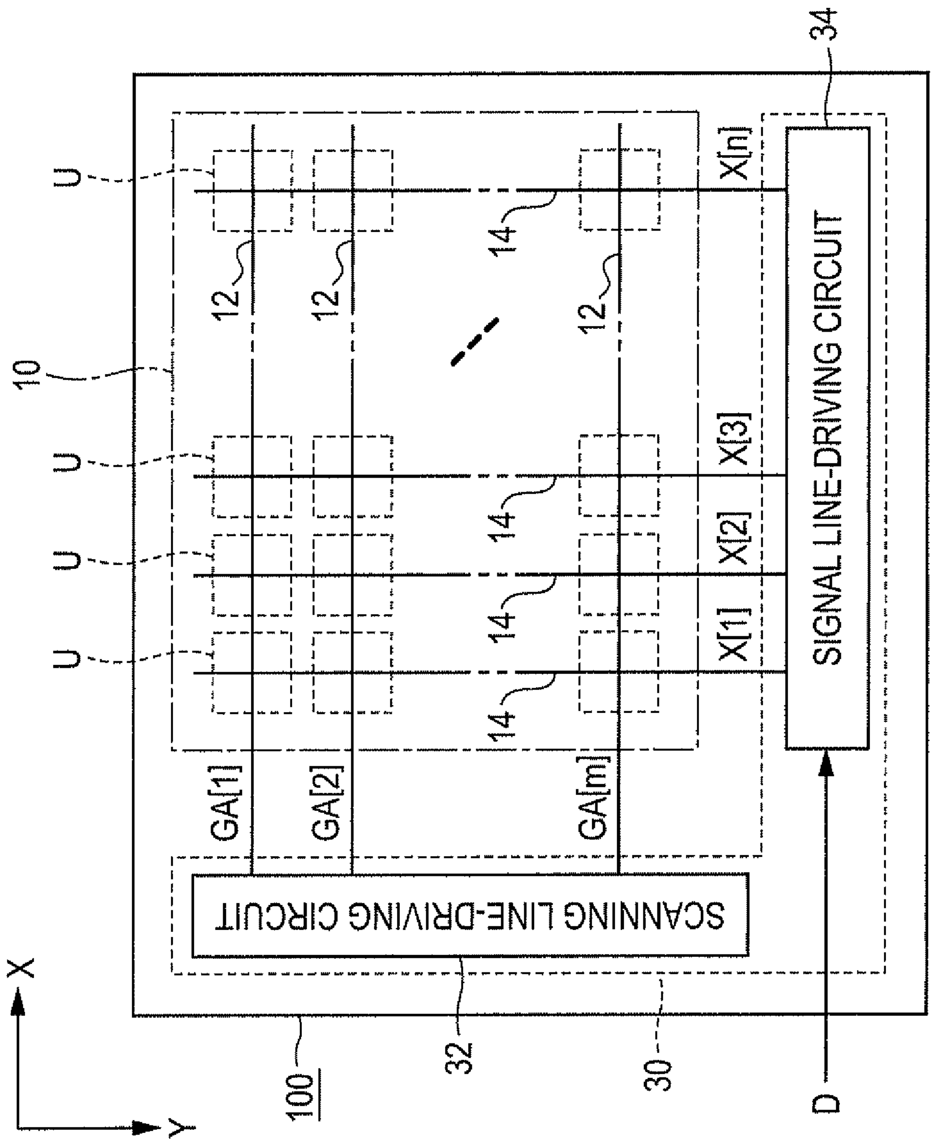
FIG. 3 is a block diagram of a light emitting device according to a first embodiment of the invention.

FIG. 3 is a block diagram of a light emitting device according to a first embodiment of the invention. The light emitting device 100 is mounted on an electronic apparatus as a display device displaying images. As illustrated in FIG. 3, the light emitting device 100 includes a device portion 10 on which a plurality of pixel circuits U is arranged, and a driving circuit 30 for driving the pixel circuits U. The driving circuit 30 is configured to include a scanning line-driving circuit 32 and a signal line-driving circuit 34. The driving circuit 30 is implemented on a plurality of distributed integrated circuits, for example. It should be noted that at least a part of the driving circuit 30 may be constructed of thin film transistors which are formed on a substrate, together with the pixel circuits U.

In the device portion 10, μ scanning lines 12 extending in the X direction and n signal lines 14 extending in the Y direction intersecting the X direction are formed (where, μ and n are natural numbers). The plurality of pixel circuits U is disposed at intersections of the scanning lines 12 and the signal lines 14 and arranged in a matrix form having μ rows in the vertical direction and n columns in the horizontal direction. The scanning line-driving circuit 32 is configured to output scanning signals GA[1] to GA[m] to the respective scanning lines 12. The signal line-driving circuit 34 is configured to output driving signals X (X[1] to X[n]) corresponding to gradation D (hereinafter, referred to as "specified gradation") specified for the respective pixel circuits U to the respective signal lines 14.

Figure 4:
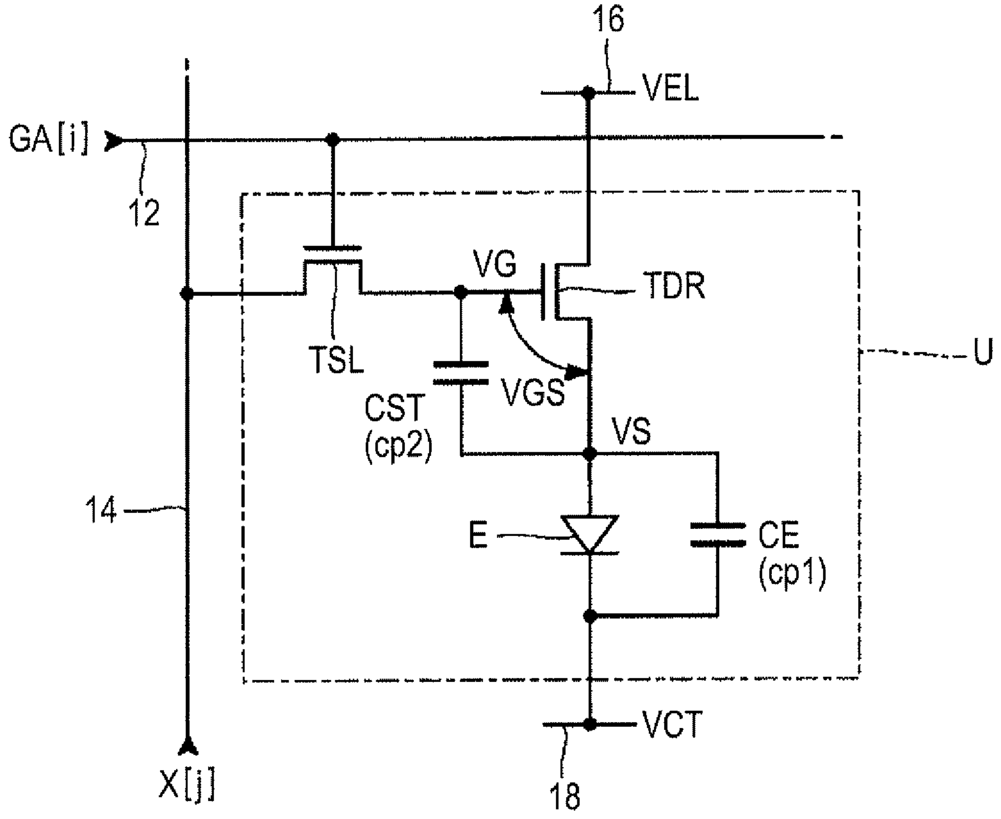
FIG. 4 is a circuit diagram of a pixel circuit.

FIG. 4 is a circuit diagram of the pixel circuit U. In FIG. 4, only one pixel circuit U disposed on the i-th row (i=1 to m) and j-th column (j=1 to n) is illustrated as a representative. As illustrated in FIG. 4, the pixel circuit U is configured to include a light emitting element E, a driving transistor TDR, a storage capacitor CST, and a select switch TSL.

The light emitting element E and the driving transistor TDR are arranged in series on a path that connects a power supply line 16 (at potential VEL) and a power supply line 18 (at potential VCT). The light emitting element E is an organic EL element in which a light emitting layer formed of an organic electroluminescent (EL) material is sandwiched between its opposite terminals, namely, the anode and cathode thereof. As depicted in FIG. 4, the capacitor CE (with capacitance cp1) shown in FIG. 1 is associated with the light emitting element E.

The driving transistor TDR is an N-channel transistor (for example, a thin-film transistor) having a drain thereof being connected to the power supply line 16 while a source thereof is connected to the anode of the light emitting element E. The storage capacitor CST (with capacitance cp2) is disposed between the source (the path between the light emitting element E and the driving transistor TDR) of the driving transistor TDR and the gate of the driving transistor TDR.

The select switch TSL is disposed between the signal line 14 and the gate of the driving transistor TDR to control the electrical connection (conduction/non-conduction) between them. As depicted in FIG. 4, for example, an N-channel transistor (a thin-film transistor) is preferably employed as the select switch TSL. The gates of the select switches TSL of each of the n pixel circuits U disposed on the i-th row are commonly connected to the scanning lines 12 on the i-th row.

Figure 5:
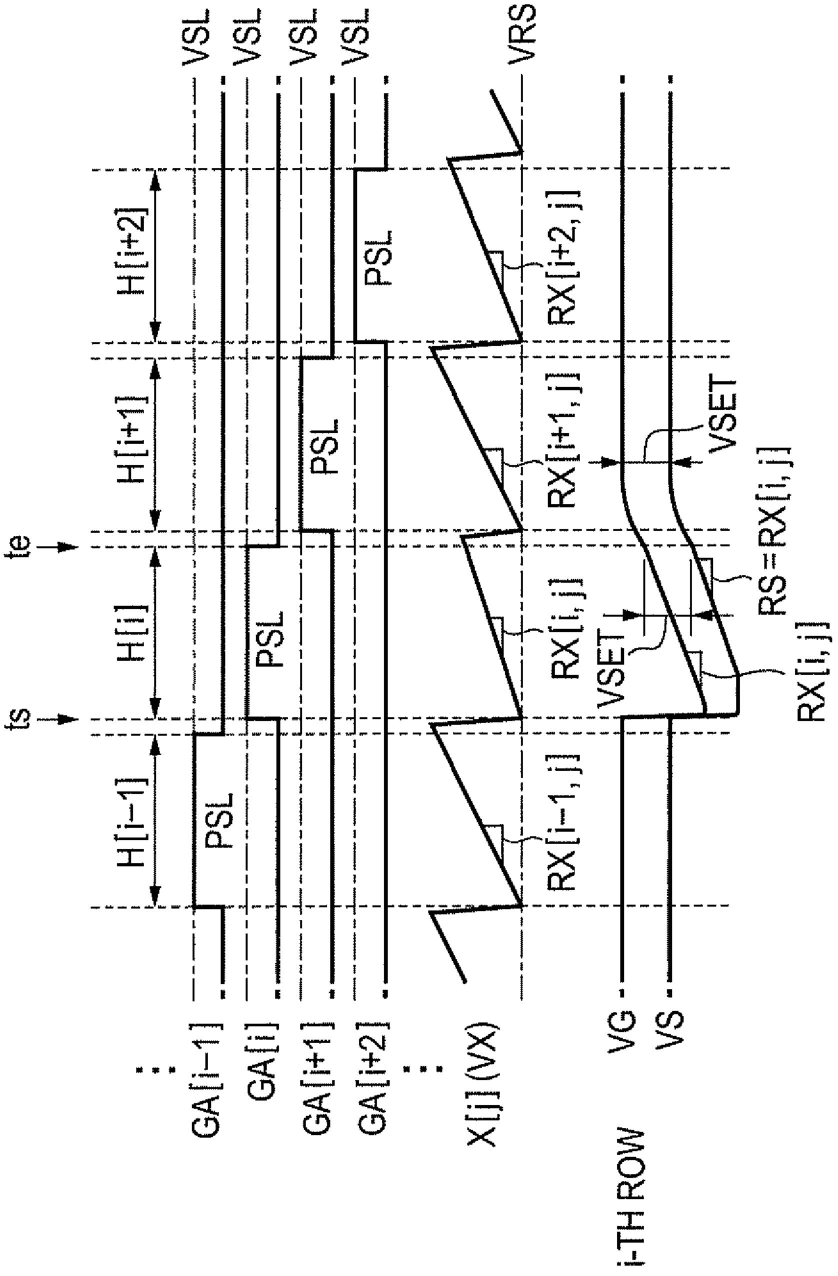
FIG. 5 is a timing chart illustrating the operation of the light emitting device.

Next, with reference to FIG. 5, the operation (the method of driving the pixel circuit U) of the driving circuit 30 will be described with particular attention to the pixel circuit U disposed on the i-th row and the j-th column. The scanning line-driving circuit 32 sequentially sets the scanning signals GA[1] to GA[m] to a selection potential VSL (active level) in each of μ unit time periods H (H[1] to H[m]) within a vertical scanning period, thereby sequentially selecting the respective scanning lines 12 (a group of n pixel circuits U on each row). As illustrated in FIG. 5, the scanning signal GA[i] is a voltage signal in which a selection pulse PSL of the selection potential VSL occurs in the i-th unit time period H[i] within the vertical scanning period. The occurrence of the selection pulse PSL (selection potential VSL) means that the scanning line 12 is selected. When the scanning signal GA[i] transitions to the selection potential VSL (i.e., the selection pulse PSL is supplied), the select switches TSL of each of the n pixel circuits U on the i-th row are simultaneously changed to an ON state.

The signal line-driving circuit 34 generates driving signals X[1] to X[n] of which the potential VX varies over time with a period of a unit time period H and outputs the driving signals to the respective signal lines 14. The potential VX of each of the driving signals X[1] to X[n] is set to a reference potential VRS at the starting point ts of the unit time period H and linearly rises with a time rate of change RX (RX=dVX/dt) during periods from the starting point ts to the end point te of the unit time period H. That is to say, the driving signals X[1] to X[n] are voltage signals having a ramp waveform (saw-tooth wave) of which the period is the unit time period H.

Figure 6:
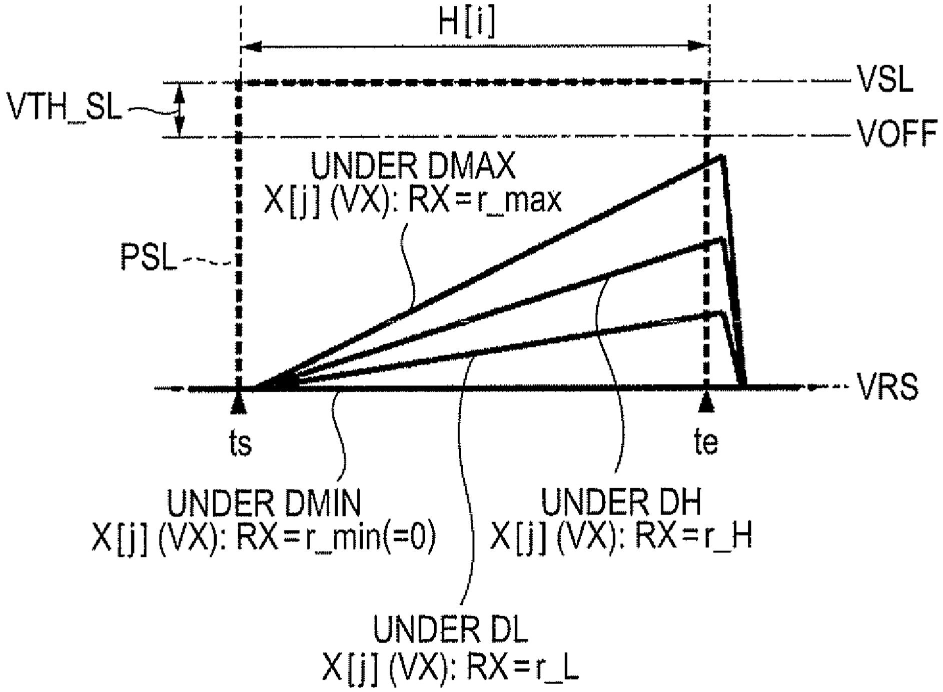
FIG. 6 is a waveform diagram of a driving signal.

In the unit time period H[i] in which the scanning line 12 on the i-th row is selected, the time rate of change RX[i,j] of the potential VX of the driving signal X[j] supplied to the signal lines 14 on the j-th column is set to be variable in accordance with the specified gradation D of the pixel circuit U disposed on the i-th row and the j-th column. More specifically, as illustrated in FIG. 6, the higher the specified gradation D of the pixel circuit U (the larger the driving current IDR to be supplied to the light emitting element E), the higher the set time rate of change RX[i,j] of the potential VX of the driving signal X[j] in the unit time period H[i] becomes. That is to say, the higher the specified gradation D of the pixel circuit U, the steeper the gradient of the potential VX with respect to the time axis becomes.

For example, when the specified gradation D is the minimum gradation DMIN (a black display in which no driving current IDR is supplied to the light emitting element E), the time rate of change RX[i,j] of the potential VX of the driving signal X[j] is set to the minimum value r_min (zero). That is to say, the potential VX of the driving signal X[j] does not change within the unit time period H[i]. On the other hand, when the specified gradation D is the maximum gradation DMAX (a white display), the time rate of change RX[i,j] of the potential VX of the driving signal X[j] is set to the maximum value r_max. Moreover, the setting value r_H of the time rate of change RX[i,j] for the specified gradation of an intermediate gradation DH is higher than the setting value r_L of the time rate of change RX[i,j] for the specified gradation of an intermediate gradation DL lower than the intermediate gradation DH.

The maximum value r_max of the time rate of change RX[i,j] corresponding to the maximum gradation DMAX is set so that the difference (the gate-source voltage of the select switch TSL) between the potential VX of the driving signal X[j] and the selection potential VSL of the selection pulse PSL is higher than a threshold voltage VTH_SL of the select switch TSL at the end point te of the unit time period H[i]. That is to say, as illustrated in FIG. 6, for any of the specified gradations D from the minimum gradation DMIN to the maximum gradation DMAX, the potential VX of the driving signal X[j] at the end point te of the unit time period H[i] is lower than a potential VOFF which is lower than the selection potential VSL by the threshold voltage VTH_SL. Therefore, the select switch TSL transitions to an OFF state in response to the arrival of the end point te (the trailing edge of the selection pulse PSL) of the unit time period H[i], independent of the specified gradation D.

When the selection pulse PSL of the scanning signal GA[i] is supplied from the scanning line-driving circuit 32, so that the select switches TSL of the respective pixel circuits U on the i-th row are changed to the ON state, the gates of the driving transistors TDR are electrically connected to the signal line 14. As a result, the gate of the driving transistor TDR of the pixel circuit U disposed on the i-th row and the j-th column is also supplied with the driving signal X[j] similar to the example illustrated in FIG. 1, and as shown in FIG. 5, the potential VG of the gate of the driving transistor TDR rises over time with the time rate of change RX[i,j] corresponding to the specified gradation D of the pixel circuit U. On the other hand, the current IDS corresponding to a variation in the potential VG flows between the drain and the source of the driving transistor TDR, and thus, the source potential VS rises over time. Moreover, when the time rate of change RS (RS=dVS/dt) of the potential VS reaches an equilibrium state where it becomes identical to the time rate of change RX[i,j] of the potential VX of the driving signal X[j], the current IDS which depends only on the capacitance cp1 of the capacitor CE and the time rate of change RX[i,j] flows through the driving transistor TDR until the end point te of the unit time period H[i].

When the supply of the selection pulse PSL stops at the end point te of the unit time period H[i] (i.e., the scanning signal GA[i] drops from the selection potential VSL), the select switch TSL is changed to the OFF state, so that the supply of the driving signal X[j] to the gate of the driving transistor TDR stops. As illustrated in FIG. 5, the storage capacitor CST maintains therein a voltage VSET corresponding to the current IDS flowing through the driving transistor TDR at the point in time when the supply of the driving signal X[j] stops. That is to say, the voltage VSET is a gate-source voltage VGS required to cause the current IDS expressed by the Equation 3 to flow through the driving transistor TDR, the current IDS being determined by the capacitance cp1 of the capacitor CE and the time rate of change RX[i,j] (in other words, independent of the mobility μ or the threshold voltage VTH of the driving transistor TDR).

Since the voltage VSET is stored in the storage capacitor CST, the current IDS is able to flow between the drain and the source of the driving transistor TDR even after the supply of the driving signal X[j] stops. Therefore, the source potential VS of the driving transistor TDR rises over time. On the other hand, when the select switch TSL transitions to the OFF state, the gate of the driving transistor TDR is held in an electrically floating state. Therefore, as illustrated in FIG. 5, the gate potential VG of the driving transistor TDR rises with the potential of the source potential VS. That is to say, while the gate-source voltage VGS of the driving transistor TDR maintains the voltage VSET set in the unit time period H[i], the open circuit voltage (the source potential VS of the driving transistor TDR) of the capacitor CE increases gradually. When the open circuit voltage of the capacitor CE reaches the threshold voltage VTH_OLED of the light emitting element E, the current IDS corresponding to the voltage VSET flows as the driving current DR through the light emitting element E. The light emitting element E is lighted with the luminance (specified gradation D) corresponding to the current amount of the driving current IDR.

The driving current IDR is maintained at a current amount substantially equal to the current IDS flowing through the driving transistor TDR at the point in time when the supply of the driving signal X[j] stops. Since the current IDS is dependent on the time rate of change RX[i,j] which is set to be variable in accordance with the specified gradation D (see Equation 3), the driving current IDR of the current amount corresponding to the specified gradation D is supplied to the light emitting element E. As described above, the light emitting element E of the pixel circuit U disposed on the i-th row and the j-th column is supplied with the driving current DR corresponding to the time rate of change RX[i,j] (specified gradation D) of the potential VX of the driving signal X[j] in the unit time period H[i] after the passing of the unit time period H[i].

For example, since the time rate of change RX[i,j] for the specified gradation of the minimum gradation DMIN is set to the minimum value r_min (zero), the current amount of the driving current IDR is set to zero, so that the light emitting element E is controlled to be the minimum gradation (black display). The current amount (gradation of the light emitting element E) of the driving current IDR when the time rate of change RX[i,j] of the driving signal X[j] is set to the setting value r_H corresponding to the intermediate gradation D_H is greater than the current amount of the driving current DR when the time rate of change RX[i,j] is set to the setting value r_L (r_L<r_H) corresponding to the intermediate gradation D_L. Moreover, since the time rate of change RX[i,j] for the specified gradation of the maximum gradation DMAX is set to the maximum value r_max, the current amount of the driving current IDR is set to the maximum value, so that the light emitting element E is controlled to be the maximum gradation (white display). The driving current DR is continuously supplied until the open circuit voltage VSET of the storage capacitor CST is updated in the next unit time period H[i] during which the scanning line 12 on the i-th row is selected.

In the above-described embodiment, the open circuit voltage VSET of the storage capacitor CST is set so that the current IDS (current being independent of the mobility μ or the threshold voltage VTH of the driving transistor TDR) corresponding to the time rate of change RX[i,j] of the potential VX of the driving signal X[j] flows through the driving transistor TDR. Therefore, it is possible to suppress the variations (in other words, the luminance variations of the light emitting element E) in the driving current IDR due to the characteristics (the mobility P or the threshold voltage VTH) of the driving transistor TDR, independently of the specified gradation D of each of the pixel circuits U. As a result, it is possible to provide an advantage that the variations in gradation of images displayed on the device portion 10, for example, can be suppressed.

B-2: Configuration of Signal Line-Driving Circuit 34

Figure 7:
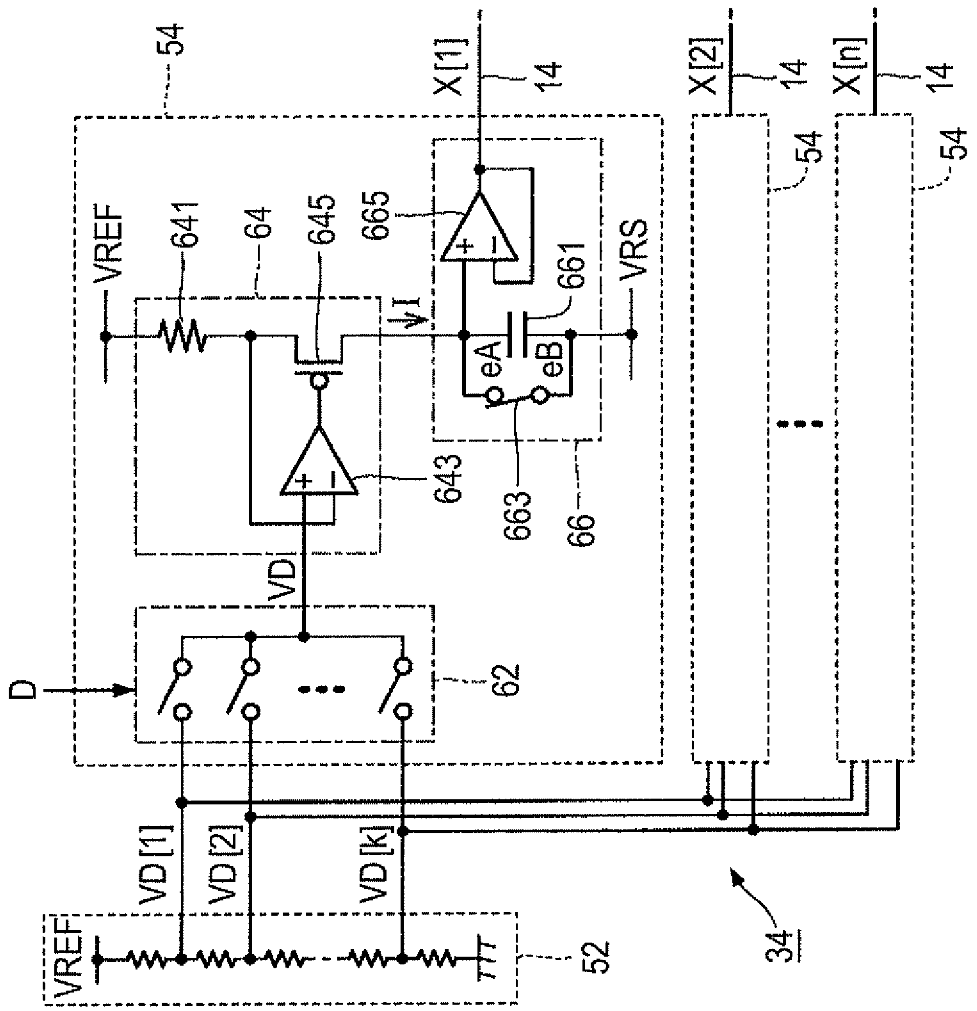
FIG. 7 is a circuit diagram of a signal line-driving circuit.

FIG. 7 is a block diagram of the signal line-driving circuit 34. The signal line-driving circuit 34 is configured to include a voltage generating circuit 52 and n signal generation circuits 54 corresponding in number to the total number (the number of columns of the pixel circuits U) of the signal lines 14. The voltage generating circuit 52 generates k kinds of potentials VD (VD[1] to VD[k]) corresponding to the total number of specified gradations D specified for the pixel circuits U. For example, as illustrated in FIG. 7, as the voltage generating circuit 52, a ladder resistor circuit that divides a predetermined voltage VREF with a plurality of series-connected resistors is preferably used. The k kinds of potentials VD[1] to VD[k] are commonly supplied to the n signal generation circuits 54.

The signal generation circuit 54 on the j-th column generates a driving signal X[j] and outputs the signal to the signal line 14 on the j-th column. As illustrated in FIG. 7, each of the signal generation circuits 54 is configured to include a potential selecting portion 62, a current generating portion 64, and a waveform generating portion 66. The potential selecting portion 62 of the signal generation circuit 54 on the j-th column selects, for every unit time period H, the potential VD corresponding to the specified gradation D of each of the pixel circuits U on the j-th column among the k kinds of potentials VD[1] to VD[k] generated by the voltage generating circuit 52. The higher the specified gradation D, the lower the potential VD that is selected by the potential selecting portion 62 will be.

The current generating portion 64 is a constant current source that generates a current I corresponding to the potential VD selected by the potential selecting portion 62. The current generating portion 64 is implemented by a circuit in which a resistor (with resistance R0) 641, an operational amplifier 643, and a transistor 645 are combined together. The resistor 641 is disposed between a line to which the voltage VREF is supplied and the source of the transistor 645. The transistor 645 has its source connected to the inverting input terminal (−) of the operational amplifier 643 and its gate connected to the output terminal of the operational amplifier 643. The potential VD selected by the potential selecting portion 62 is supplied to the non-inverting input terminal (+) of the operational amplifier 643. In the above-described configuration, the transistor 645 generates the current I (I=(VREF−VD)/R0) so that its source potential becomes substantially identical to the potential VD selected by the potential selecting portion 62.

The waveform generating portion 66 is configured to include a capacitive element 661, a switch 663, and a buffer 665. The capacitive element 661 (with capacitance C0) is comprised of an electrode eA connected to the drain of the transistor 645 and an electrode eB connected to the line to which a reference potential VRS is supplied. The switch 663 is disposed between the electrode eA and the electrode eB, and the buffer 665 is disposed between the electrode eA and the signal line 14 on the j-th column.

In the above-described configuration, when the switch 663 is momentarily conducted at the starting point ts of the unit time period H[i], the potential of the electrode eA of the capacitive element is initialized to the reference potential VRS. In response to the charging of the capacitive element 661 by the supply of the current I from the current generating portion 64, the potential of the electrode eA begins to rise over time from the reference potential VRS. Then, the potential VX output from the buffer 665 in accordance with the potential of the electrode eA is supplied to the signal line 14 as the driving signal X[j]. Therefore, the potential VX of the driving signal X[j] changes with the time rate of change RX (dVX/dt) given by Equation 4 below. Since the potential selecting portion 62 selects the potential VD given by Equation 4 in accordance with the specified gradation D, the time rate of change RX of the potential VX of the driving signal X[j] is set to be variable in accordance with the specified gradation D as described above with reference to FIG. 6.

$$RX \to dVX/dt = (VREF - VD)/R0/C0 \quad \text{Equation 4}$$

Figure 8:
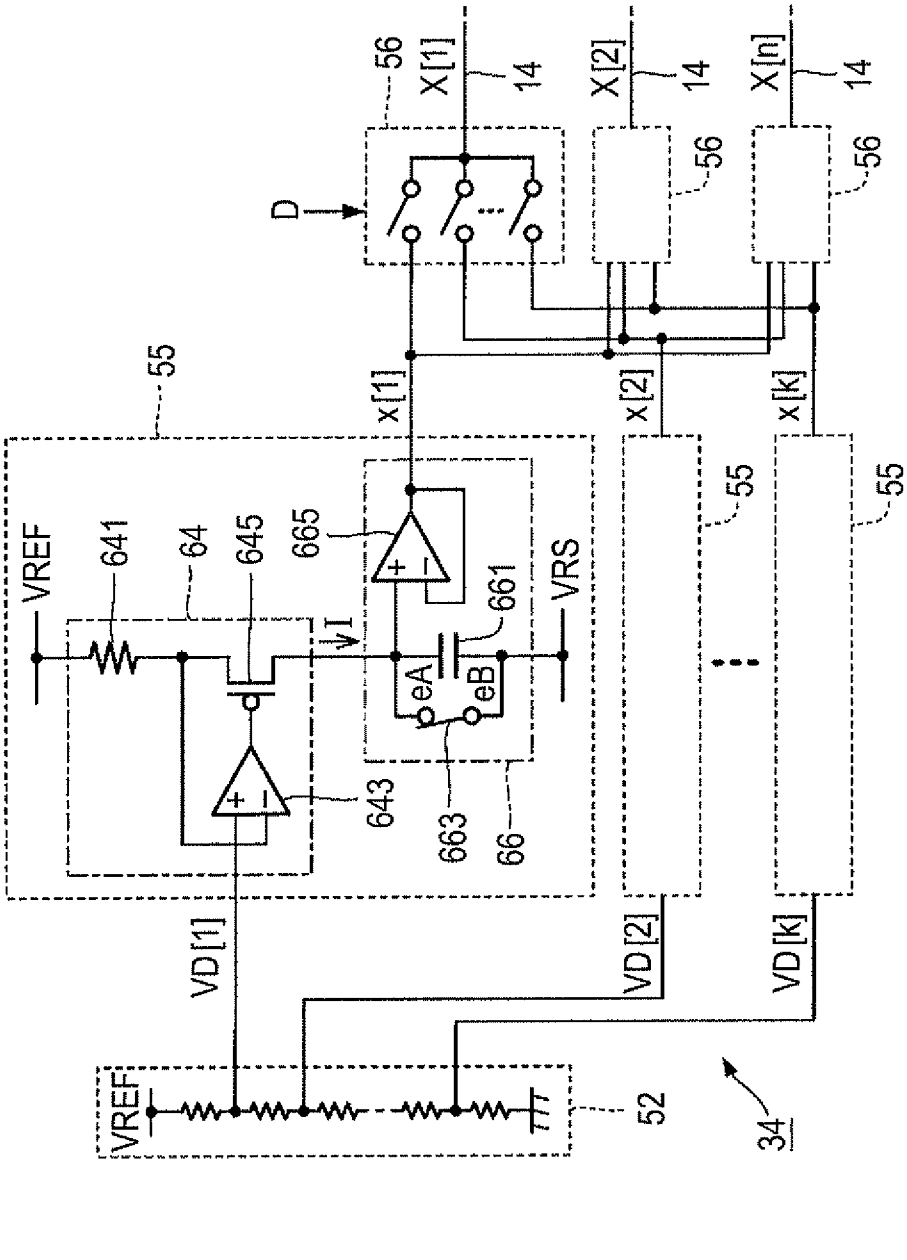
FIG. 8 is another circuit diagram of the signal line-driving circuit.

As illustrated in FIG. 8, a configuration may be employed in which one kind of signal x selected in accordance with the specified gradation D among k kinds of signals x (x[1] to x[k]) corresponding in number to the total number of specified gradations D is output to the signal line 14 as the driving signal X[j]. The signal line-driving circuit 34 in FIG. 8 is configured to include a voltage generating circuit 52, k signal generation circuits 55 corresponding in number to the total number of specified gradations D, and n selecting portions 56 corresponding in number to the total number of signal lines 14. The signal generation circuit 55 has such a configuration that the potential selecting portion 62 is omitted from the signal generation circuit 54 in FIG. 7. In current generating portion 64 of the signal generation circuit 55, any one of the k kinds of potentials VD[1] to VD[k] generated by the voltage generating circuit 52 is supplied to the non-inverting input terminal (+) of the operational amplifier 643.

In the above-described configuration, the buffer 665 of the waveform generating portion 66 in each of the signal generation circuits 55 outputs the signals x (x[1] to x[k]) of which the potential changes, for every unit time period H, with the time rate of change corresponding to the potential VD which is supplied from the voltage generating circuit 52 to the corresponding signal generation circuit 55. The selecting portion 56 on the j-th column selects the signal x corresponding to the specified gradation D of each of the pixel circuits U on the j-th column among the k kinds of signals x (x[1] to x[k]) generated by the signal generation circuits 55 as the driving signal X[j] for every unit time period H and outputs the selected signal x to the signal lines 14 on the j-th column. Therefore, the time rate of change RX of the potential VX of the driving signal X[j] is set to be variable in accordance with the specified gradation D as described above with reference to FIG. 6.

Figure 9:
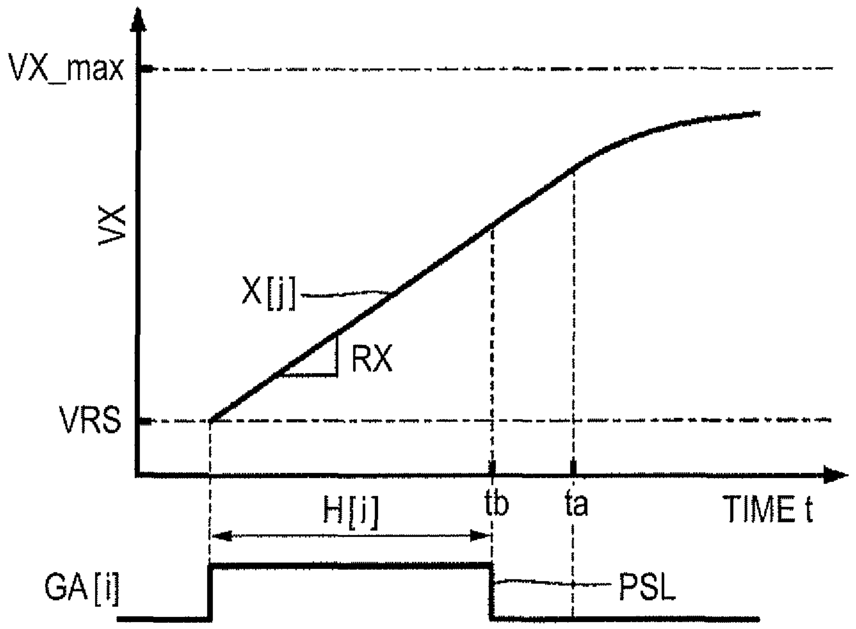
FIG. 9 is a conceptual diagram for explaining the relationship between the potential of a driving signal and the end point of a unit time period.

The potential VX of the driving signal X[j] output by the signal line-driving circuit 34, illustrated in FIG. 7 or 8 changes within a range below a predetermined value VX_max corresponding to the voltage VREF used in the voltage generating circuit 52 or the current generating portion 64, as illustrated in FIG. 9. That is to say, as illustrated in FIG. 9, the time rate of change RX decreases as the potential VX increases during the unit time period H[i] and approaches the predetermined value VX_max. Moreover, the current amount of the driving current IDR is determined by the time rate of change RX of the potential VX at the point in time (the end point te of the unit time period H[i]) when the supply of the driving signal X[j] stops. Therefore, in the configuration that the select switch TSL transitions to the OFF state at the point in time occurring after a time point ta at which the time rate of change RX starts to decrease while approaching the predetermined value VX_max, there might occur such an unfavorable state that the actual gradation of the light emitting element E is lower than the specified gradation D. The higher the specified gradation D, the greater the amount of increase in the potential VX becomes (i.e. the easier it becomes to approach the predetermined value VX_max), and accordingly, the insufficient gradation problem is particularly serious on the higher gradation side. Although it is possible to configure the signal line-driving circuit 34 so that the upper limit VX_max of the potential VX can have a sufficiently high potential, according to such a configuration, the signal line-driving circuit 34 is required to have properties enabling it to withstand high voltage (which may eventually increase the cost of the signal line-driving circuit 34).

From the viewpoint of solving the above-mentioned problems, it is desirable to employ a configuration as illustrated in FIG. 9 that the end point te (the trailing edge of the selection pulse PSL) of the unit time period H is chosen so that the select switch TSL transitions to the OFF state at the point in time tb prior to the point in time ta at which the time rate of change RX of the driving signal X[j] begins to decrease. According to the above-described configuration, since the time rate of change RX of the potential VX at the point in time when the supply of the driving signal X[j] stops can be accurately set in accordance with the specified gradation D, it is possible to provide an advantage that the gradation of the light emitting element E can be controlled with high accuracy.

C: Specific Example of Waveform of Driving Signal X[j]

Similar to the example in FIG. 6, in the case of changing the potential VX of the driving signal X[j] with the high time rate of change RX (i.e., the case of ensuring a sufficiently large current amount of the driving current DR) under the requirements that the potential VX of the driving signal X[j] is continuously increased from the starting point ts of the unit time period H[i] and that the select switch TSL is controlled to be in the OFF state at the end point te of the unit time period H[i], independent of the specified gradation D, the potential VX of the driving signal X[j] is required to be set to an extremely high potential at the end point te of the unit time period H[i]. Therefore, the signal line-driving circuit 34 is required to have properties enabling it to withstand high voltage. Moreover, in order for the select switch TSL to be maintained in the ON state until the end point te of each of the unit time periods H[i], the selection potential VSL of the selection pulse PSL is required to be set to be higher than a voltage that is higher than the potential VX of the driving signal X[j] at the end point te of the unit time period H[i] by the amount of the threshold voltage VTH_SL of the select switch TSL. Therefore, the scanning line-driving circuit 32 is also required to have properties enabling it to withstand high voltage. In consideration of the above-mentioned circumstances, configurations for reducing the amplitude of the driving signal X[j] (i.e., reducing the voltage withstanding requirements for the scanning line-driving circuit 32 or the signal line-driving circuit 34) are illustrated as second to fourth embodiments below.

Prior to description of the second to fourth embodiments, the correlation between the time rate of change RX of the potential VX of the driving signal X[j] and the period of time elapsed until the source potential VS of the driving transistor TDR reaches the equilibrium state (i.e., the time rate of change RS of the potential VS converges into the time rate of change RX of the driving signal X[j]) will be discussed.

Figure 10A:
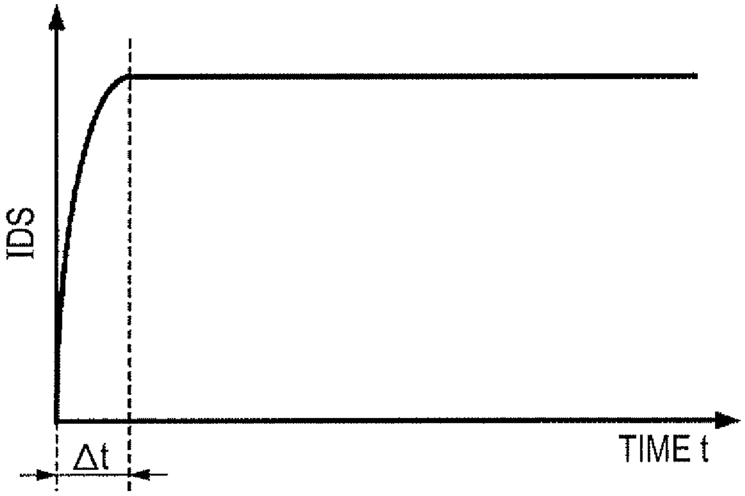
FIGS. 10A and 10B are graphs for explaining the period of time elapsed until the driving transistor reaches an equilibrium state when the time rate of change of the potential of the driving signal is high.
Figure 10B:
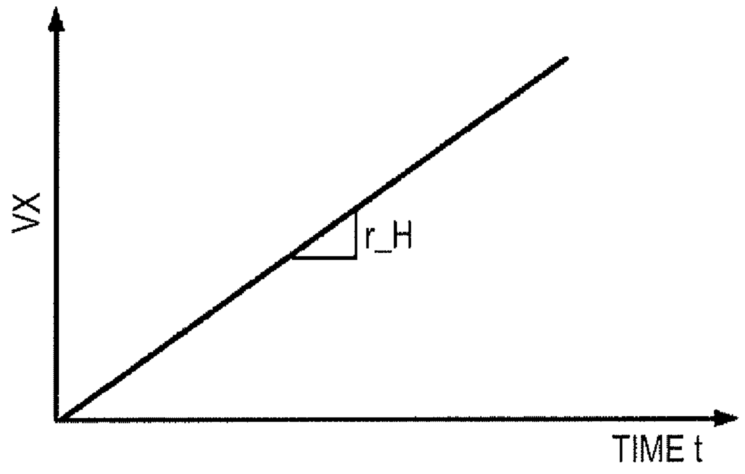
Figure 11A:
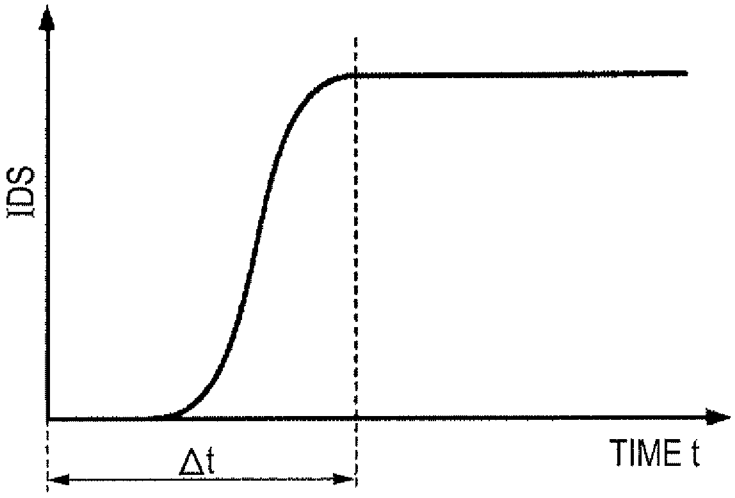
FIGS. 11A and 11B are graphs for explaining the period of time elapsed until the driving transistor reaches an equilibrium state when the time rate of change of the potential of the driving signal is low.
Figure 11B:
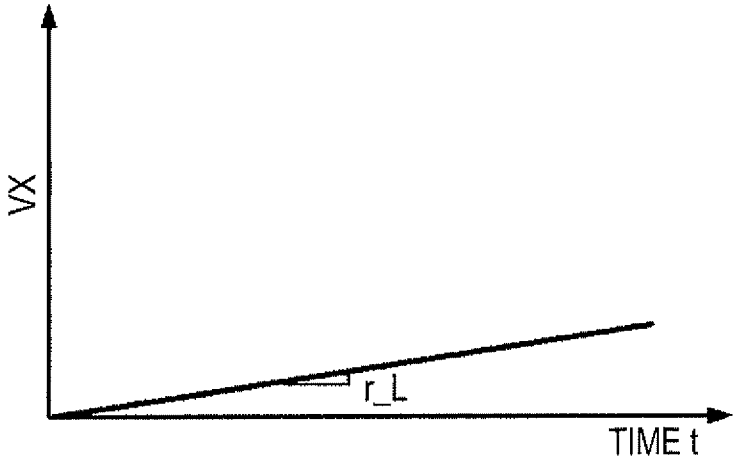

FIGS. 10 and 11 are graphs illustrating the correlation between the time rate of change RX of the potential VX of the driving signal X and the drain-source current IDS of the driving transistor TDR. FIGS. 10A and 10B depict the change over time of the current IDS when the potential VX was changed with the time rate of change RX (r_H) corresponding to the high intermediate gradation DH. On the other hand, FIGS. 11A and 11B depict the change over time of the current IDS when the potential VX was changed with the time rate of change RX (r_L) corresponding to the low intermediate gradation DL. In any of FIGS. 10 and 11, the gate-source voltage VGS of the driving transistor TDR was set to a voltage close to the threshold voltage VTH at the point in time (the left end of the graph) at which the potential VX begins to change. Therefore, the current IDS is zero at the point in time at which the potential VX begins to change.

As can be understood from Equation 3, the current amount of the current IDS is stabilized into a predetermined value corresponding to the time rate of change RX of the driving signal X[j] when the source potential VS of the driving transistor TDR reaches the equilibrium state after the change of the potential VX of the driving signal X[j] is begun. When the graphs in FIGS. 10A and 11A are compared, it is possible to identify the tendency that the lower the time rate of change RX, the longer the period of time Dt is required to reach the equilibrium state. In light of the above-mentioned tendency, the second to fourth embodiments will be described.

C-1: Second Embodiment

Figure 12:
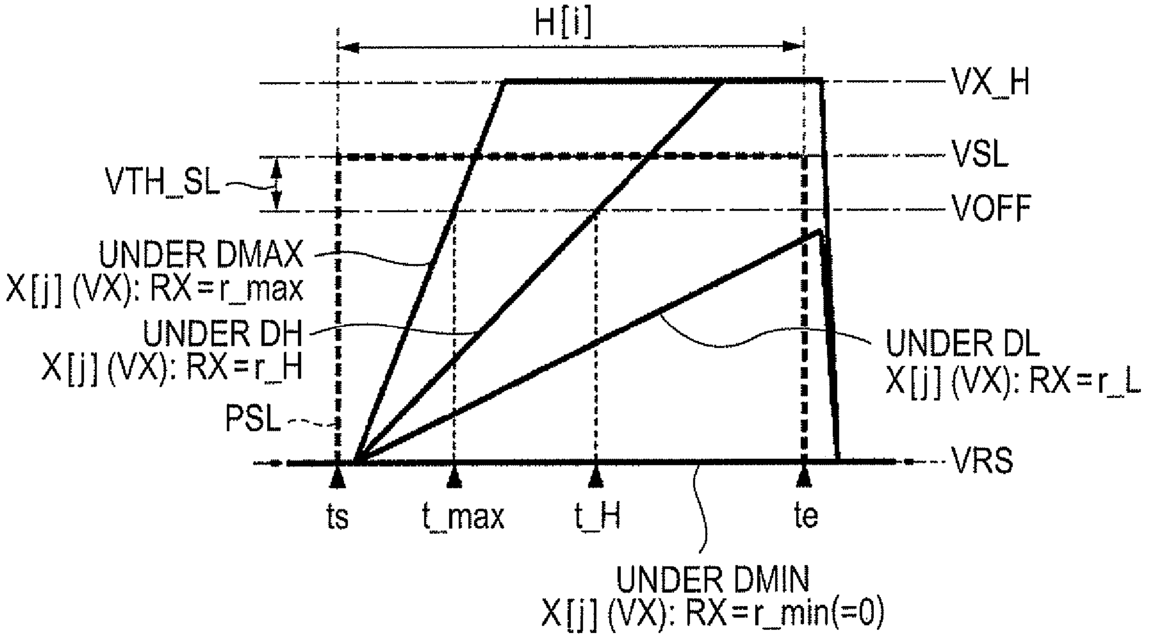
FIG. 12 is a waveform diagram of a driving signal according to a second embodiment of the invention.

FIG. 12 is a waveform diagram of the driving signal X[j] in the unit time period H[i] according to the second embodiment of the invention. As illustrated in FIG. 12, when the minimum gradation DMIN or the intermediate gradation DL lower than a predetermined value is specified, similar to the case of the first embodiment, the waveform (time rate of change RX) of the driving signal X[j] is chosen so that the potential VX of the driving signal X[j] at the end point te of the unit time period H[i] is lower than a potential VOFF (a potential lower than the selection potential VSL by the amount of the threshold voltage VTH_SL of the select switch TSL). Therefore, when the minimum gradation DMIN or the intermediate gradation DL is specified, the select switch TSL is changed to the OFF state at the end point te (the trailing edge of the selection pulse PSL) of the unit time period H[i] so that the supply of the driving signal X[j] to the gate of the driving transistor TDR stops.

On the other hand, when the maximum gradation DMAX or the intermediate gradation DH (DH>DL) higher than the predetermined value is specified, the signal line-driving circuit 34 generates the driving signal X[j] so that the difference between the potential VX of the driving signal X[j] and the selection potential VSL of the selection pulse PSL is lower than the threshold voltage VTH_SL of the select switch TSL at an intermediate time point (an earlier point in time than the trailing edge of the selection pulse PSL) in the unit time period H[i]. That is to say, when the maximum gradation DMAX or the intermediate gradation DH (DH>DL) is specified, the potential VX of the driving signal X[j] is higher than the potential VOFF at the intermediate time point in the unit time period H[i]. Therefore, the select switch TSL is changed to the OFF state at the point in time (the intermediate time point in the unit time period H[i]) prior to the arrival of the trailing edge of the selection pulse PSL.

For example, as depicted in FIG. 12, the potential VX of the driving signal X[j] for the designated gradation of the maximum gradation DMAX starts to increase at the starting point ts of the unit time period H[i] with the time rate of change RX[i,j] (r_max) corresponding to the maximum gradation DMAX and becomes higher than the potential VOFF at the intermediate time point t_max in the unit time period H[i]. Therefore, the select switch TSL changes from the ON state to the OFF state at the intermediate time point t_max. When the intermediate gradation DH is specified, the potential VX of the driving signal X[j] becomes higher than the potential VOFF at an intermediate time point t_H in the unit time period H[i], so that the select switch TSL is changed to the OFF state. The potential VX of the driving signal X[j] is maintained at a potential VX_H after the potential VX reaches the potential VX_H higher than the potential VOFF. In FIG. 12, the case where the potential VX_H is higher than the selection potential VSL is illustrated.

The period of time elapsed from the starting point ts of the unit time period H[i] until the potential VX of the driving signal X[j] becomes higher than the potential VOFF is set to a period of time longer than the period of time Dt (FIGS. 10 and 11) required for the driving transistor TDR to reach the equilibrium state. In the present embodiment, the point in time ts at which the potential VX of the driving signal X[j] begins to change is the same independent of the specified gradation D, and the higher the specified gradation D, the higher the time rate of change RX becomes. Therefore, the higher the time rate of change RX, the shorter the set period of time elapsed from the starting point ts of the unit time period H[i] becomes until the potential VX of the driving signal X[j] becomes higher than the potential VOFF. As described above with reference to FIGS. 10 and 11, because the higher the time rate of change RX, the shorter the period of time Dt required to reach the equilibrium state becomes, the period of time during which the driving signal X[j] is supplied becomes shorter as the specified gradation D increases as in the case of FIG. 12. Nevertheless, it is possible to make sure that the driving transistor TDR reaches the equilibrium state (the time rate of change RS of the source potential VS becomes identical to the time rate of change RX of the potential VX of the driving signal X[j]).

In the above-described embodiment, when the potential VX of the driving signal X[j] rises in response to the selection potential VSL of the selection pulse PSL, the select switch TSL is changed to the OFF state, so that the supply of the driving signal X[j] to the gate of the driving transistor TDR stops. Therefore, even when the potential VX of the driving signal X[j] is varied with the high time rate of change RX (for example, r_max or r_H in FIG. 12) in order to ensure a sufficient current amount of the driving current IDR, the maximum value of the potential VX is suppressed to the potential VX_H. As a result, compared with the first embodiment where the select switch TSL is changed to the OFF state at the trailing edge of the selection pulse PSL independent of the specified gradation D, it is possible to provide an advantage that the voltage withstanding requirements of the scanning line-driving circuit 32 or the signal line-driving circuit 34 can be reduced.

Above all, in the first embodiment where the potential VX of the driving signal X[j] is lower than the potential VOFF at the end point te of the unit time period H[i] independent of the specified gradation D, the point in time at which the select switch TSL is changed to the OFF state is defined at the trailing edge of the selection pulse PSL independent of the specified gradation D. Therefore, compared with the second embodiment where the select switch TSL is changed to the OFF state in accordance with the amplitude relationship between the potential VX of the driving signal X[j] and the potential VOFF, it is possible to provide an advantage that the point in time at which the supply of the driving signal X[j] to the gate of the driving transistor TDR stops can be controlled accurately.

C-2: Third Embodiment

Figure 13:
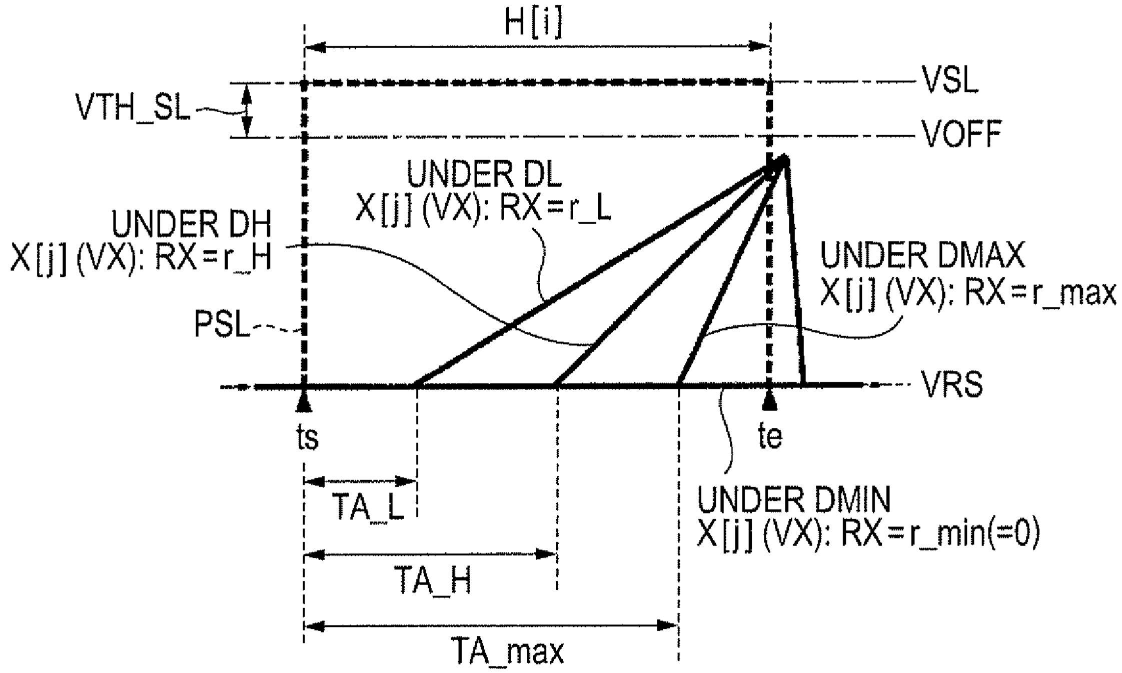
FIG. 13 is a waveform diagram of a driving signal according to a third embodiment of the invention.

FIG. 13 is a waveform diagram of the driving signal X[j] in the unit time period H[i] according to the third embodiment of the invention. In the first and second embodiments, the case where the potential VX of the driving signal X[j] begins to change at the starting point ts of the unit time period H[i] was illustrated. However, in the present embodiment, as illustrated in FIG. 13, the potential VX of the driving signal X[j] begins to change from the reference potential VRS at a point in time after the passing of an adjustment time TA from the starting point ts (the leading edge of the selection pulse PSL) of the unit time period H[i].

The adjustment time TA is set to be variable in accordance with the specified gradation D. More specifically, the signal line-driving circuit 34 generates the driving signal X[j] so that the higher the specified gradation D, the longer the adjustment time TA becomes, as illustrated in FIG. 13. For example, the adjustment time TA_H for the specified gradation of the intermediate gradation DH is set to be longer than the adjustment time TA_L for the specified gradation of the intermediate gradation DL, and the adjustment time TA for the specified gradation of the maximum gradation DMAX is set to the maximum value TA_max. The driving signal X[j] having the waveform illustrated in FIG. 13 can be generated, for example, by causing the switch 663 of the waveform generating portion 66 in FIG. 7 or 8 to be maintained in the ON state from the starting point ts of the unit time period H[i] until the point in time occurring after an elapse of the adjustment time TA corresponding to the specified gradation D.

The adjustment time TA is set in accordance with the specified gradation D so that the period of time during which the potential VX of the driving signal X[j] is varied with the time rate of change RX during the unit time period H[i] is longer than the Dt (FIGS. 10 and 11) required for setting the driving transistor TDR to the equilibrium state. Therefore, as can be understood from FIG. 13, the period of time during which the potential VX of the driving signal X[j] is varied with the time rate of change RX varies in accordance with the specified gradation D. That is to say, the higher the specified gradation D, the shorter the set period of time during which the potential VX changes becomes. The above-mentioned relationship is identical to the tendency identified from FIGS. 10 and 11 that the higher the time rate of change RX, the shorter the period of time Dt required to reach the equilibrium state becomes. Therefore, although the period of time during which the driving signal X[j] is supplied becomes shorter as the specified gradation D increases, it is possible to make sure that the driving transistor TDR reaches the equilibrium state (the time rate of change RS of the source potential VS becomes identical to the time rate of change RX of the potential VX of the driving signal X[j]).

In the above-described embodiment, since the potential VX of the driving signal X[j] begins to change at the point in time occurring after an elapse of the adjustment time TA corresponding to the specified gradation D from the starting point ts of the unit time period H[i], the potential VX at the end point te of the unit time period H[i] can be suppressed as illustrated in FIG. 13. For example, even when the potential VX of the driving signal X[j] is varied with the higher time rate of change RX compared with the first embodiment in order to ensure a sufficient current amount of the driving current IDR, similar to the case of the first embodiment, it is possible to suppress the potential VX of the driving signal X[j] at the end point te of the unit time period H[i] to a potential lower than the potential VOFF (hence, it is possible to control the select switch TSL to be in the OFF state at the end point te of the unit time period H[i] independent of the specified gradation D). As a result, compared with the first embodiment where the potential VX of the driving signal X[j] begins to change at the starting point ts of the unit time period H[i] independent of the specified gradation D, it is possible to provide an advantage that the voltage withstanding requirements of the scanning line-driving circuit 32 or the signal line-driving circuit 34 can be reduced.

In the configuration of FIG. 13, the adjustment time TA is set to be variable in accordance with the specified gradation D. However, even when the adjustment time TA is configured to be set to a fixed value independent of the specified gradation D, compared with the first embodiment where the potential VX of the driving signal X[j] begins to change at the starting point ts of the unit time period H[i], it is possible to achieve a desired effect that the potential VX at the end point of the unit time period H[i] can be suppressed. Therefore, the configuration where the adjustment time TA is fixed at a predetermined value may be employed. Nevertheless, in consideration of the tendency identified from FIGS. 10 and 11 that the higher the time rate of change RX, the shorter the period of time Dt required for the driving transistor TDR to reach the equilibrium state becomes, it is particularly desirable to employ the configuration where the adjustment time TA is controlled to be variable in accordance with the specified gradation D as illustrated in FIG. 13.

C-3: Fourth Embodiment

Figure 14:
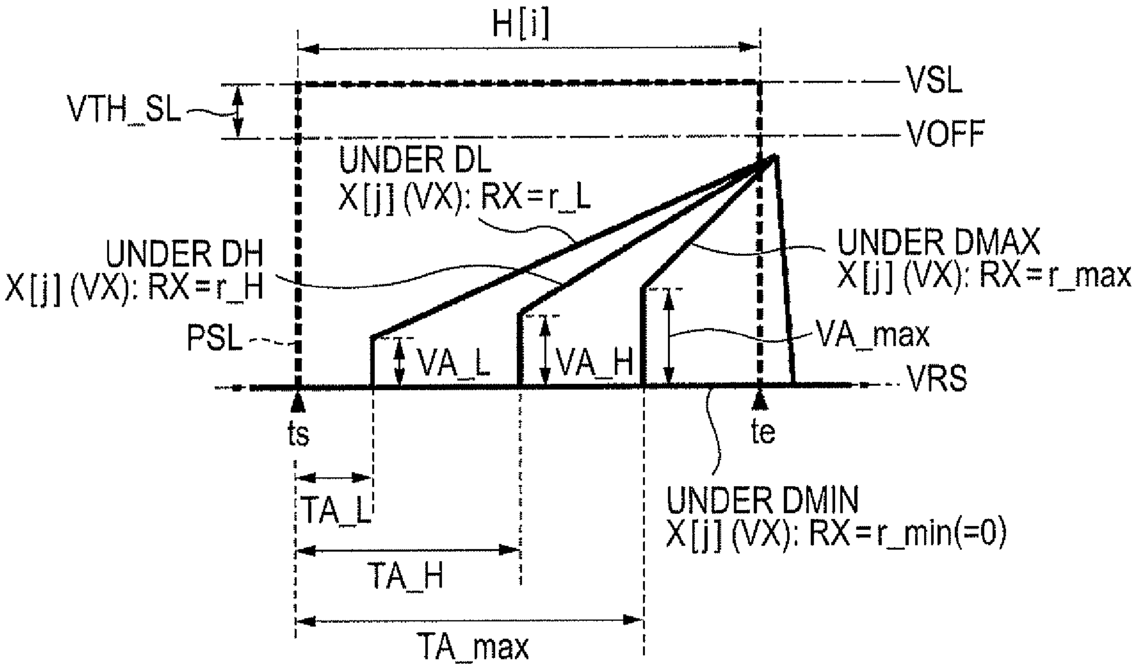
FIG. 14 is a waveform diagram of a driving signal according to a fourth embodiment of the invention.

FIG. 14 is a waveform diagram of the driving signal X[j] in the unit time period H[i] according to the fourth embodiment of the invention. In the first to third embodiments, the case where the potential VX of the driving signal X[j] is continuously changed from the reference potential VRS was illustrated. However, in the present embodiment, as illustrated in FIG. 14, the potential VX of the driving signal X[j] is changed from the reference potential VRS to a adjustment potential VA and is then changed over time with the time rate of change RX corresponding to the specified gradation D. The point in time at which the potential VX of the driving signal X[j] begins to change from the reference potential VRS to the adjustment potential VA corresponds to the point in time occurring after an elapse of the adjustment time TA from the starting point ts of the unit time period H[i]. The adjustment time TA is set to be variable in accordance with the specified gradation D, similar to the case of the third embodiment.

The adjustment potential VA is set to be variable in accordance with the specified gradation D. More specifically, the signal line-driving circuit 34 generates the driving signal X[j] so that the higher the specified gradation D, the higher the adjustment potential VA becomes. For example, as depicted in FIG. 14, the adjustment potential VA_H for the specified gradation of the intermediate gradation DH is set to be higher than the adjustment potential VA_L for the specified gradation of the intermediate gradation DL (DL<DH), and the adjustment potential VA for the specified gradation of the maximum gradation DMAX is set to the maximum value VA_max. Since the potential VX of the driving signal X[j] does not vary during the unit time period H[i] in which the minimum gradation DMIN is specified, the adjustment potential VA corresponding to the minimum gradation DMIN is set to zero (minimum value).

In the above-described configuration, the current IDS given by Equation 2 begins to flow through the driving transistor TDR at the point in time at which the potential VX of the driving signal X[j] is increased from the reference potential VRS to the adjustment potential VA. Therefore, compared with the first to third embodiments where the potential VX is continuously changed from the reference potential VRS, the period of time elapsed until the driving transistor TDR reaches the equilibrium state within the unit time period H[i] can be reduced. Detailed description thereof will be provided below.

Figure 15:
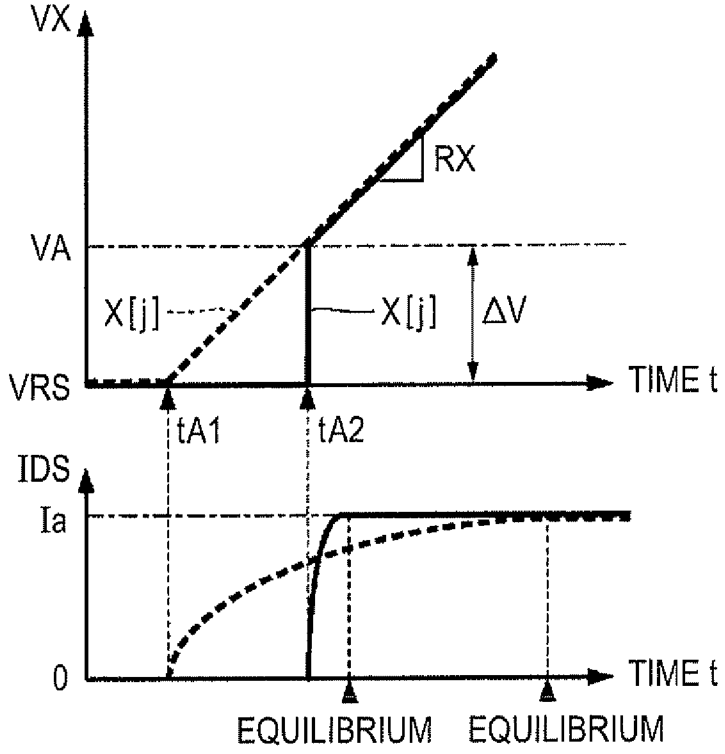
FIG. 15 is a conceptual diagram for explaining the effect of the fourth embodiment.

In FIG. 15, the driving signal X[j] and the current IDS for the case where the potential VX was continuously changed with the time rate of change RX from the reference potential VRS at the point in time tA1 within the unit time period H[i] are depicted by the dotted line, and the driving signal X[j] and the current IDS for the present embodiment case where the potential VX was changed at the point in time tA2 from the reference potential VRS to the adjustment potential VA and then changed with the time rate of change RX are depicted by the solid line.

As depicted with the dotted line in FIG. 15, when the potential VX is continuously changed from the reference potential VRS, the current IDS begins to increase gradually at the point in time tA1 and reaches a target value Ia corresponding to the specified gradation D. On the other hand, when the potential VX is changed at the point in time tA2 from the reference potential VRS to the adjustment potential VA, the current IDS close to the target value Ia begins to flow right after the point in time tA2, and thus, the driving transistor TDR can reach the equilibrium state quickly. As described above, since the period of time required for the driving transistor TDR to reach the equilibrium state can be reduced, according to the present embodiment, it is possible to provide an advantage that the unit time period H[i] can be reduced (eventually, the number of scanning lines 12 can be increased, thereby achieving high-definition image display).

In order to allow the driving transistor TDR to reach the equilibrium state, it is necessary to continuously vary the potential VX of the driving signal X[j] with the time rate of change RX. In the present embodiment, since the driving transistor TDR can reach the equilibrium state quickly by varying the potential VX to the adjustment potential VA, the period of time during which the potential VX of the driving signal X[j] is varied with the time rate of change RX can be reduced. That is to say, even when the potential VX is not continuously varied until the potential VX rises up to an extremely high potential, the driving transistor TDR can reach the equilibrium state. Therefore, it is possible to provide an advantage that the amplitude of the driving signal X[j] can be reduced (eventually, the voltage withstanding requirements of the scanning line-driving circuit 32 or the signal line-driving circuit 34 can be reduced).

Figure 16:
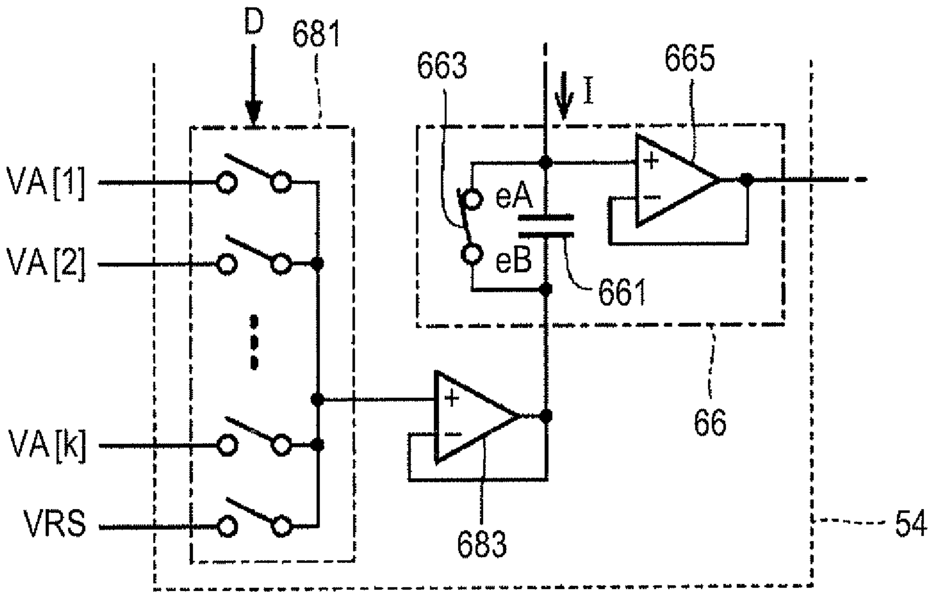
FIG. 16 is a circuit diagram of a signal line-driving circuit.

FIG. 16 is a circuit diagram of a part of the signal line-driving circuit 34 for generating the driving signal X[j] illustrated in FIG. 14. As illustrated in FIG. 16, in the signal line-driving circuit 34, an adjustment potential selecting portion 681 is provided for each of the signal generation circuits 54 of FIG. 7 (or for each of the signal generation circuits 55 of FIG. 8). The adjustment potential selecting portions 681 are commonly supplied with k kinds of adjustment potentials VA (VA[1] to VA[k]) corresponding in number to the total number of specified gradations D and the reference potential VRS. The k kinds of adjustment potentials VA (VA[1] to VA[k]) are generated, for example, by the same ladder resistor circuit as the voltage generating circuit 52 illustrated in FIG. 7.

The adjustment potential selecting portion 681 selects, for every unit time period H, any one of the k kinds of adjustment potentials VA[1] to VA[k] in accordance with the specified gradation D of the pixel circuit U. More specifically, the adjustment potential selecting portion 681 of the signal generation circuit 54 on the j-th column selects the reference potential VRS during a period from the starting point ts of the unit time period H[i] to the end of the adjustment time TA and selects the adjustment potential VA corresponding to the specified gradation D of each of the pixel circuits U on the j-th column among the k kinds of adjustment potentials VA[1] to VA[k] during a period from the end of the adjustment time TA to the end point te of the unit time period H[i].

The reference potential VRS or the adjustment potential VA selected by the adjustment potential selecting portion 681 is supplied to the electrode eB of the capacitive element 661 in the waveform generating portion 66 via the buffer 683. The switch 663 of the waveform generating portion 66 is controlled to be in the ON state when the reference potential VRS is selected by the adjustment potential selecting portion 681, and is controlled to be in the OFF state when the adjustment potential VA is selected by the adjustment potential selecting portion 681. Therefore, similar to the example in FIG. 14, the potential VX of the driving signal X[j] begins to change from the reference potential VRS to the adjustment potential VA at the point in time occurring after the passing of the adjustment time TA from the starting point ts of the unit time period H[i] and then varies over time from the adjustment potential VA with the time rate of change RX corresponding to the specified gradation D.

Although in FIG. 14, the potential VX of the driving signal X[j] was changed to the adjustment potential VA at the point in time occurring after the passing of the adjustment time TA from the starting point of the unit time period H[i], the point in time at which the potential VX is changed to the adjustment potential VA can be appropriately changed. For example, a configuration where the potential VX is changed from the reference potential VRS to the adjustment potential VA at the same point in time (for example, the starting point ts of the unit time period H[i]) independent of the specified gradation D may be employed. That is to say, in the configuration where the potential VX of the driving signal X[j] is set to the adjustment potential VA and is then varied with the time rate of change RX, the configuration of the third embodiment where the adjustment time TA is prepared before the potential VX is changed is not essential.

In the configuration of FIG. 14, the adjustment potential VA is set to be variable in accordance with the specified gradation D. However, even when the adjustment potential VA is configured to be set to a fixed value independent of the specified gradation D, it is possible to achieve a desired effect that the period of time elapsed until the driving transistor TDR reaches the equilibrium state can be reduced. Therefore, the configuration where the adjustment potential VA is set to a predetermined value independent of the specified gradation D may be employed.

C-4: Other Embodiments

It may be desirable to have a configuration in which the second to fourth embodiments are appropriately combined with each other. For instance, a configuration may be employed in which, when a specific gradation D (the maximum gradation DMAX or the high intermediate gradation DH) is specified in the third or fourth embodiment, the potential VX of the driving signal X[j] in the intermediate time point of the unit time period H[i] is higher than the potential VOFF similar to the case of the second embodiment (i.e., the select switch TSL transitions to the OFF state).

D: Initialization of Gate-Source Voltage VGS of Driving Transistor TDR

In the above-described embodiments, in order to allow the driving transistor TDR to change into the equilibrium state by supplying the driving signal X[j], it is necessary to set the gate-source voltage VGS to be higher than the threshold voltage VTH, thereby causing the current IDS to flow through the driving transistor TDR. However, the gate-source voltage VGS may become lower than the threshold voltage VTH due to various reasons. For example, one reason is that immediately after the light emitting device 100 is powered on, the voltage VGS is in an indefinite state and hence may become lower than the threshold voltage VTH. Another reason for the possibility of the voltage VGS becoming lower than the threshold voltage VTH may be the influence of external disturbance such as noise.

The lower the voltage VGS at the starting point of the unit time period H[i], compared with the threshold voltage VTH, the longer the period of time elapsed until the voltage VGS reaches the threshold voltage VTH with the supply of the driving signal X[j] becomes. Therefore, a considerable amount of time may be required for the driving transistor TDR to reach the equilibrium state. The above-mentioned problem becomes particularly obvious when a lower gradation is specified, because for low specified gradations D, the amount of increase in the gate potential VG of the driving transistor TDR within the unit time period H[i] is small. For instance, a case may occur where the driving transistor TDR is unable to reach the equilibrium state within one unit time period H[i].

In respective embodiments below (fifth to tenth embodiments), a configuration will be described in which the gate-source voltage VGS of the driving transistor TDR is initialized to a predetermined voltage, thereby reducing the period of time elapsed until the driving transistor TDR is changed to the ON state from the starting point of the unit time period H[i] (namely, the period of time elapsed until the voltage VGS becomes higher than the threshold voltage VTH). Although a configuration where the initialization of the voltage VGS is applied to the first embodiment will be described below, it goes without saying that the same configuration may be similarly applied to the second to fourth embodiments.

D-1: Fifth Embodiment

Figure 17:
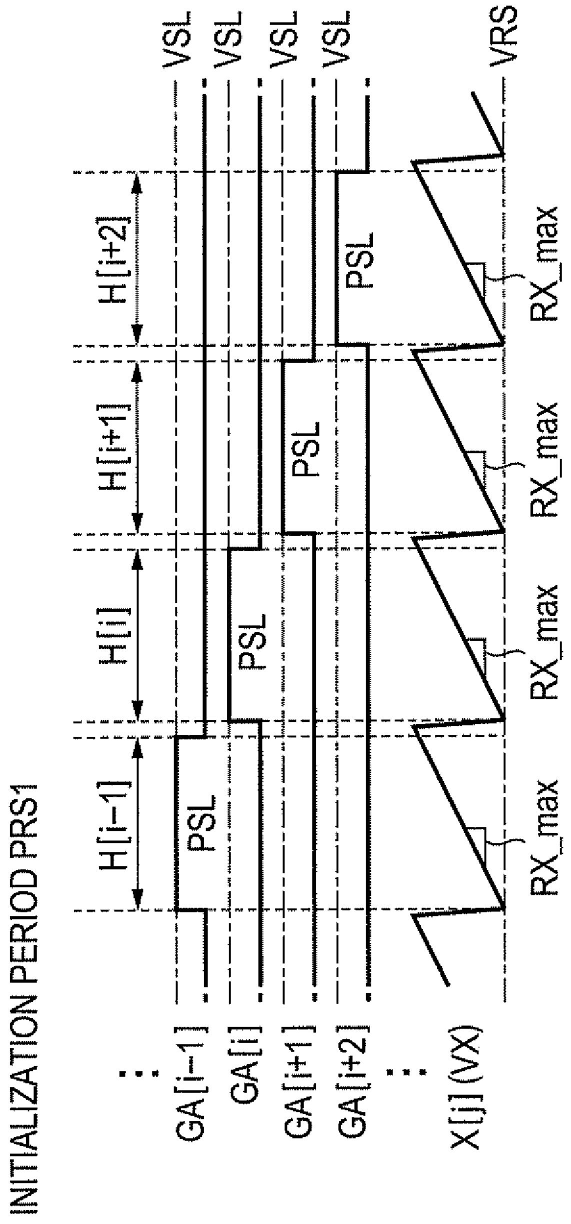
FIG. 17 is a timing chart illustrating the operation of a light emitting device according to a fifth embodiment of the invention.

FIG. 17 is a timing chart illustrating the operation according to the fifth embodiment of the invention. In FIG. 17, there is illustrated only the operation within a predetermined period (hereinafter, referred to as "initialization period") PRS1 which is set immediately after the light emitting device 100 is powered on. The initialization period PRS1 is a period (for example, one vertical scanning period) for initializing the gate-source voltage VGS of each of the driving transistors TDR of the respective pixel circuits U. The operations of driving the light emitting elements E of the respective pixel circuits U to the gradation corresponding to the specified gradation D after the passing of the initialization period PRS1 are the same as those of the above-described embodiments.

In the initialization period PRS1, the entire pixel circuits U within the device portion 10 are driven similar to the case where the maximum gradation DMAX is specified. Specifically, as illustrated in FIG. 17, the scanning line-driving circuit 32 sequentially sets the scanning signals GA[1] to GA[m] to the selection potential VSL for every unit time period H, and the signal line-driving circuit 34 changes the potential VX of each of the driving signals X (X[1] to X[n]) for every unit time period H with the time rate of change r_max corresponding to the maximum gradation DMAX. Therefore, in the respective unit time periods H within the initialization period PRS1, the gate potential VG of each of the driving transistors TDR in the respective pixel circuits U rises sufficiently high, and the gate-source voltage VGS becomes higher than the threshold voltage VTH, whereby the driving transistor TDR is changed to the ON state. That is to say, the open circuit voltage VGS of the storage capacitor CST of each of the respective pixel circuits U is initialized to a voltage at which the driving transistor TDR is in the ON state.

As described above, the driving transistor TDR of each of the respective pixel circuits U is controlled to be in the ON state during the initialization period PRS1. Therefore, for example, even when the voltage VGS of the driving transistor TDR is lower than the threshold voltage VTH at the point in time when the light emitting device 100 is powered on, since the driving signals X[j] are supplied in the respective unit time periods H occurring after the passing of the initialization period PRS1 (namely, at the time when the respective pixel circuits U are actually driven in accordance with the specified gradations D), the current IDS can quickly and with certainty flow through the driving transistor TDR. As a result, it is possible to provide an advantage that the period of time required for the driving transistor TDR to transition to the equilibrium state can be reduced.

The time rate of change RX of the driving signal X (X[t] to X[n]) within the initialization period PRS1 is not limited to the maximum value r_max corresponding to the maximum gradation DMAX. Preferably, the time rate of change RX is chosen so as to allow the gate potential VG of the driving transistor TDR to be changed during the unit time period H within the initialization period PRS1, so that the driving transistor TDR is in the ON state. For example, a configuration may be employed in which the potential VX of the driving signal X within the initialization period PRS1 is changed with the time rate of change RX (for example, the time rate of change r_H corresponding to the high intermediate gradation DH) corresponding to the specified gradation D lower than the maximum gradation DMAX or the time rate of change RX which is set to be independent of the specified gradation D.

D-2: Sixth Embodiment

Figure 18:
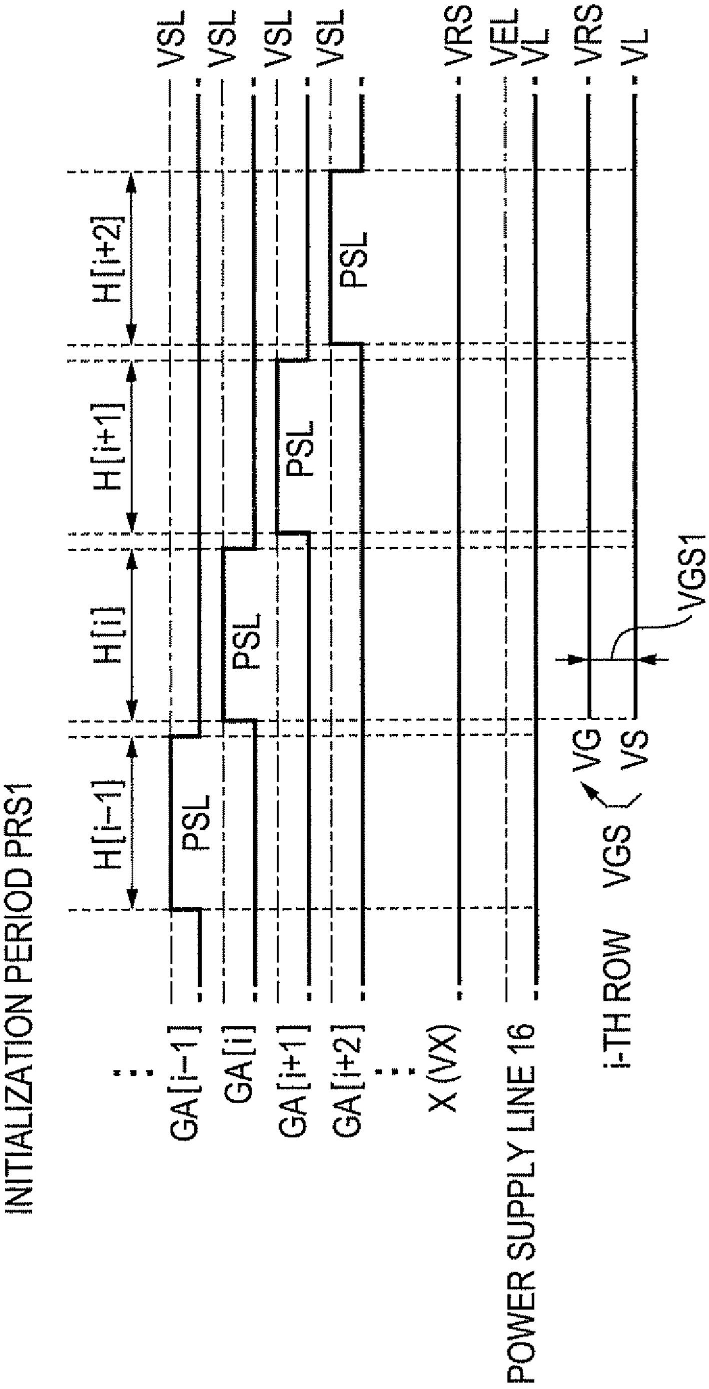
FIG. 18 is a timing chart illustrating the operation of a light emitting device according to a sixth embodiment of the invention.

FIG. 18 is a timing chart illustrating the operation within the initialization period PRS1 according to the sixth embodiment of the invention. Similar to the case of the fifth embodiment, the operation of initializing the voltage VGS of each of the driving transistors TDR of the respective pixel circuits U is executed in the initialization period PRS1, and then, the same operation as the first embodiment is executed when the initialization period PRS1 has elapsed. The initialization period PRS1 corresponds to one vertical scanning period occurring immediately after the light emitting device 100 is powered on, for example.

As illustrated in FIG. 18, the signal line-driving circuit 34 fixes the potential of each of the driving signals X (X[1] to X[n]) output to the respective signal lines 14 to the reference potential VRS within the initialization period PRS1. On the other hand, a predetermined potential VL is supplied to the power supply line 16. The scanning line-driving circuit 32 sequentially sets the scanning signals GA[1] to GA[m] to the selection potential VSL for every unit time period H within the initialization period PRS1. Therefore, during the unit time periods H[i] within the initialization period PRS1, as illustrated in FIG. 18, the select switches TSL in the respective pixel circuits U on the i-th row are controlled to be in the ON state. As a result, the reference potential VRS is supplied from the signal lines 14 to the gates of the driving transistors TDR, and the source potential VS of each of the driving transistors TDR is set to the potential VL of the power supply line 16. That is to say, the gate-source voltage VGS (the open circuit voltage of the storage capacitor CST) of the driving transistor TDR is initialized to a voltage VGS1 (VGS1=VRS−VL) which is the difference between the reference potential VRS and the potential VL.

The reference potential VRS and the potential VL are chosen so that the voltage VGS1, which is the difference between them, is higher than the threshold voltage VTH of the driving transistor TDR (VRS−VL>VTH), and that the open circuit voltage of the light emitting element E is lower than the threshold voltage VTH_OLED of the light emitting element E (VL−VCT<VTH_OLED). Therefore, during the initialization period PRS1, the light emitting elements E of the respective pixel circuits U are maintained in the OFF state (non-emission state), while the driving transistors TDR of the respective pixel circuits U are in the ON state.

In the above-mentioned embodiment, the voltage VGS of each of the driving transistors TDR of the respective pixel circuits U is initialized to a voltage VGS1 capable of allowing the driving transistors TDR to be in the ON state. Therefore, similar to the case of the fifth embodiment, even when the voltage VGS of the driving transistor TDR is lower than the threshold voltage VTH at the point in time when the light emitting device 100 is powered on, it is possible to make sure that the driving transistors TDR quickly transition to the equilibrium state in the respective unit time periods H occurring after the passing of the initialization period PRS1

(namely, at the stage in time when the respective pixel circuits U are actually driven in accordance with the gradations D).

D-3: Seventh Embodiment

Figure 19:
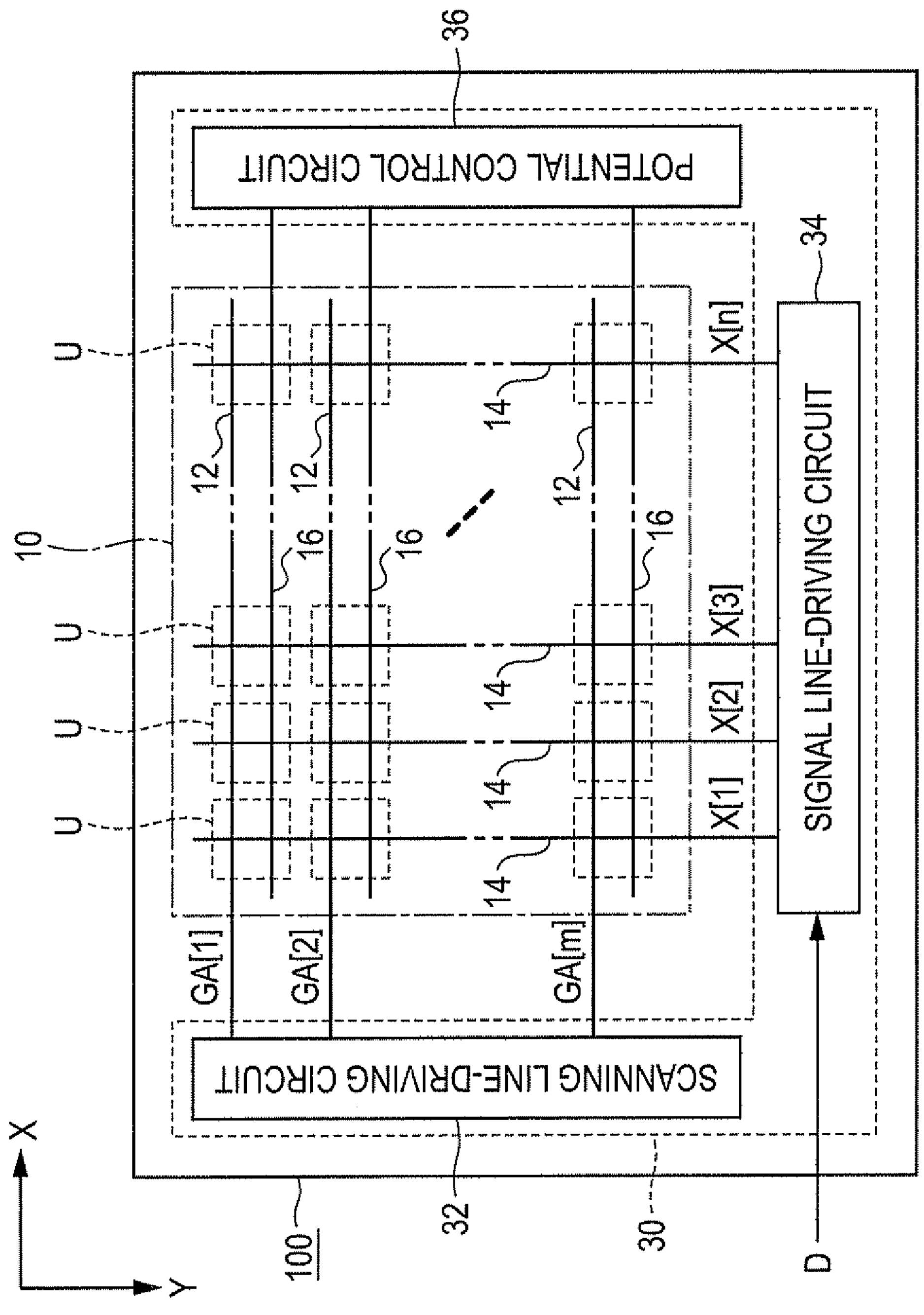
FIG. 19 is a block diagram of a light emitting device according to a seventh embodiment of the invention.

FIG. 19 is a block diagram of the light emitting device 100 according to a seventh embodiment of the invention. In the device portion 10 of the light emitting device 100 illustrated in FIG. 19, μ power supply lines 16 extending in the X direction together with the respective scanning lines 12 are formed. The driving circuit 30 includes a potential control circuit 36 configured to individually control the potential of each of the μ power supply lines 16. Other configurations are the same as those of FIG. 3.

Figure 20:
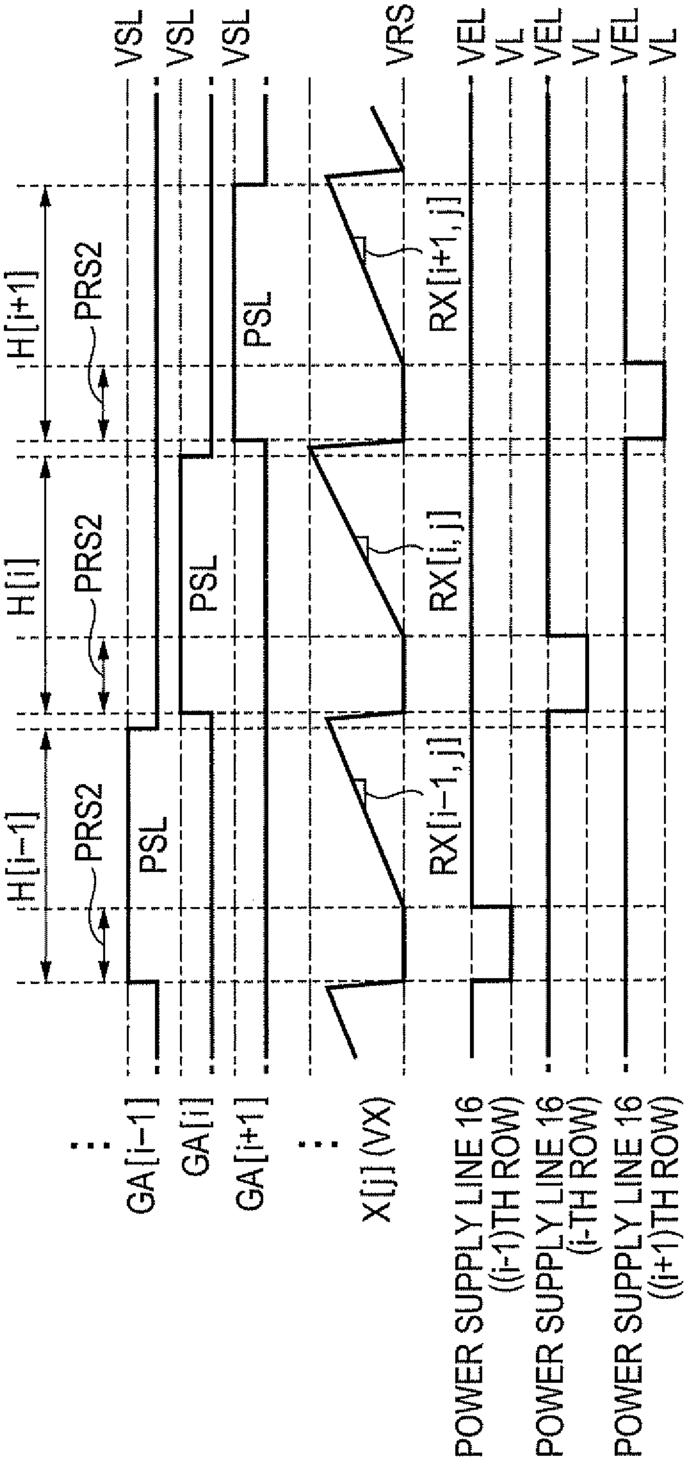
FIG. 20 is a timing chart illustrating the operation of a light emitting device according to the seventh embodiment.

FIG. 20 is a timing chart illustrating the operation according to the present embodiment. Although in the fifth or sixth embodiment, the initialization period PRS1 is set to occur immediately after the light emitting device 100 is powered on, in the present embodiment, the voltage VGS of each of the driving transistors TDR in the respective pixel circuits U on the i-th row is initialized during an initialization period PRS2 that is set within the respective unit time periods H[i].

As illustrated in FIG. 20, the initialization period PRS2 during which the voltage VGS of each of the driving transistors TDR on the i-th row is initialized corresponds to a predetermined period of time elapsed from the starting point ts of the unit time period H[i] during which the scanning signals GA[i] are set to the selection potential VSL. The signal line-driving circuit 34 maintains the potential VX of the driving signals X (X[1] to X[n]) at the reference potential VRS during the initialization period PRS2 within the respective unit time periods H[i], and changes the potential VX with the time rate of change RX corresponding to the specified gradation D at the point in time occurring after the passing of the initialization period PRS2 during the unit time periods H[i].

As illustrated in FIG. 20, the potential control circuit 36 supplies the potential VL to the power supply lines 16 on the i-th row during the initialization period PRS2 within the unit time periods H[i] and supplies a potential VEL to the power supply lines 16 on the i-th row during other periods. Therefore, during the initialization period PRS2 within the unit time periods H[i], similar to the case of the sixth embodiment, the voltage VGS of each of the driving transistors TDR in the pixel circuits U on the i-th row is initialized to a voltage VGS1 (VGS1=VRS−VL) which is the difference between the reference potential VRS supplied to the gates thereof and the potential VL supplied to the source thereof. The requirements of the reference potential VRS or the potential VL are the same as those of the sixth embodiment. Moreover, the operations performed during periods of time occurring after the passing of the initialization period PRS2 within the respective unit time periods H are the same as those of the first embodiment, for example.

In the above-mentioned embodiment, the same advantages as those of the fifth or sixth embodiment can be achieved. Additional advantage of the present embodiment is that, because the voltage VGS of each of the driving transistors TDR is initialized for every unit time period H, the driving current DR which is set in the unit time periods H[i] is not affected by the specified gradations D during the unit time periods H[i] of the previous vertical scanning period, as will be described later.

Now, a case will be considered where under the conditions of the first embodiment where no initialization period PRS2 is set, for one pixel circuit U on the i-th row, the maximum gradation DMAX (or the high intermediate gradation DH) is specified in the first unit time period H[i], and the minimum gradation DMIN (or the low intermediate gradation DL) is specified in the second unit time period H[i] during which the i-th row is subsequently selected. In the first unit time period H[i], the time rate of change RX of the potential VX of the driving signal X[j] is set to the maximum value r_max, so that the voltage VGS is set to the maximum value. Therefore, there is a possibility that, even when the driving signal X[j] of which the time rate of change RX of the potential VX is the minimum value r_min (zero) is supplied to the gate of the driving transistor TDR during the second unit time period H[i], the voltage VGS of the driving transistor TDR does not completely fall up to the voltage VSET corresponding to the minimum gradation DMIN until the end point te of the second unit time period H[i]. Therefore, in some cases, the driving current IDR is supplied to the light emitting elements E despite of the fact that the minimum gradation DMIN is specified, thereby lowering the contrast of displayed images.

In the present embodiment, since the voltage VGS of each of the driving transistors TDR is initialized to the predetermined value VGS1 (VGS1=VRS−VL) during the initialization period PRS2 within the respective unit time periods H[i], it is possible to provide an advantage that the voltage VGS of the driving transistor TDR can be accurately set to the voltage VSET corresponding to the specified gradation D in the second unit time period H[i] independent of the voltage VSET set during the first unit time period H[i] (namely, independent of the previous specified gradation D).

D-4: Eighth Embodiment

Figure 21:
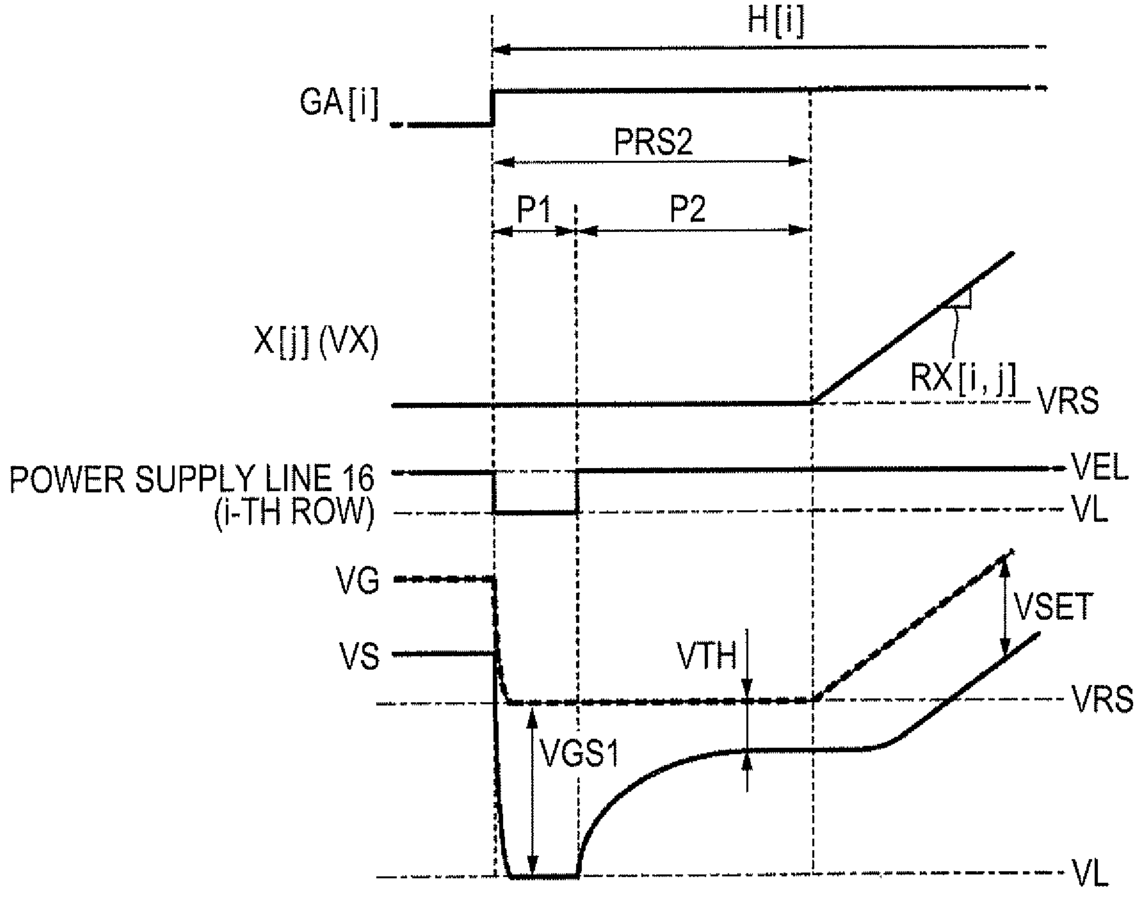
FIG. 21 is a timing chart illustrating the operation of a light emitting device according to an eighth embodiment of the invention.

FIG. 21 is a timing chart illustrating the operation of the light emitting device 100 according to the eighth embodiment of the invention. As illustrated in FIG. 21, the operations (the waveform of the scanning signal GA[i] and the driving signal X[j]) of the scanning line-driving circuit 32 and the signal line-driving circuit 34 during the respective unit time periods H[i] are the same as those of the seventh embodiment. Moreover, the configuration of the light emitting device 100 is the same as that of the seventh embodiment.

The initialization period PRS2 within the respective unit time periods H[i] is divided into period P1 and period P2. The potential control circuit 36 supplies the potential VL to the power supply lines 16 on the i-th row during the period P1 of the initialization period PRS2 within the unit time periods H[i] and supplies the potential VEL to the power supply lines 16 on the i-th row during other periods (including the period P2 within the unit time periods H[i]). Therefore, similar to the case of the seventh embodiment, during the period P1 within the unit time periods H[i], the voltage VGS of the driving transistor TDR in each of the pixel circuits U on the i-th row is initialized to the predetermined voltage VGS1 (VGS1=VRS−VL), whereby the driving transistor TDR is changed to the ON state.

When the period P2 within the unit time periods H[i] begins, the potential VL of the power supply lines 16 on the i-th row changes to the potential VEL. Since the driving transistor TDR has transitioned to the ON state during the period P1, under such a state, the current IDS as expressed by Equation 1 flows between the drain and the source of the driving transistor TDR, whereby electric charges are stored in the capacitor CE and the storage capacitor CST. Therefore, as illustrated in FIG. 21, the source potential VS of the driving transistor TDR increases over time. Since the gate of the driving transistor TDR is continuously maintained at the reference potential VRS from the period P1, the voltage VGS of the driving transistor TDR falls with the increase in the source potential VS. As can be understood from Equation 1, the current IDS decreases as the voltage VGS decreases to approach the threshold voltage VTH. Therefore, in the period P2, an operation (hereinafter, referred to as "approaching operation") of causing the voltage VGS of the driving transistor TDR to approach to the threshold voltage VTH from the voltage VGS1 after initialization during the period P1 is executed. The length of the period P2 is set so that the voltage VGS of the driving transistor TDR sufficiently approaches (ideally, becomes identical to) the threshold voltage VTH.

In the above-mentioned embodiment, since the gate-source voltage VGS of the driving transistor TDR is initialized for every unit time period H[i], the same advantages as those of the seventh embodiment can be achieved Moreover, in the present embodiment, the gate-source voltage VGS of the driving transistor TDR approaches the threshold voltage VTH before the potential VX of the driving signal X[j] is changed during the respective unit time periods H[i]. For example, even when the voltage VGS of the driving transistor TDR is set to a high voltage VSET corresponding to the maximum gradation DMAX or the high intermediate gradation DH during the first unit time period H[i], the voltage VGS of the driving transistor TDR is initialized to a voltage close to the threshold voltage VTH during the initialization period PRS of the second unit time period H[i] during which the i-th row is subsequently selected. Therefore, even when the time rate of change RX of the gate potential VG of the driving transistor TDR is set to a low value during the second unit time period H[i] during which the minimum gradation DMIN or the intermediate gradation DL is specified, it is possible to accurately set the voltage VGS of the driving transistor TDR to a low voltage VSET corresponding to the minimum gradation DMIN or the intermediate gradation DL at the point in time occurring after the passing of the period P2 during the second unit time period H[i].

D-5: Ninth Embodiment

In the eighth embodiment, the approaching operation of the respective pixel circuits U on the i-th row was performed during the period P2 within the unit time period H[i]. However, since it takes a considerable amount of time for the gate-source voltage VGS of the driving transistor TDR to reach the threshold voltage VTH, in fact, it is necessary to set the unit time period H[i] to be longer. Moreover, the longer the unit time period H[i], the more it will be difficult to achieve high precision (increases in the number of rows) of the pixel circuit U. Therefore, in ninth and tenth embodiments described below, the approaching operation is performed over a plurality of unit time periods H, so that the voltage VGS of the driving transistor TDR is set with certainty to the threshold voltage VTH while reducing the length of the unit time period H.

Figures 22A, 22B:
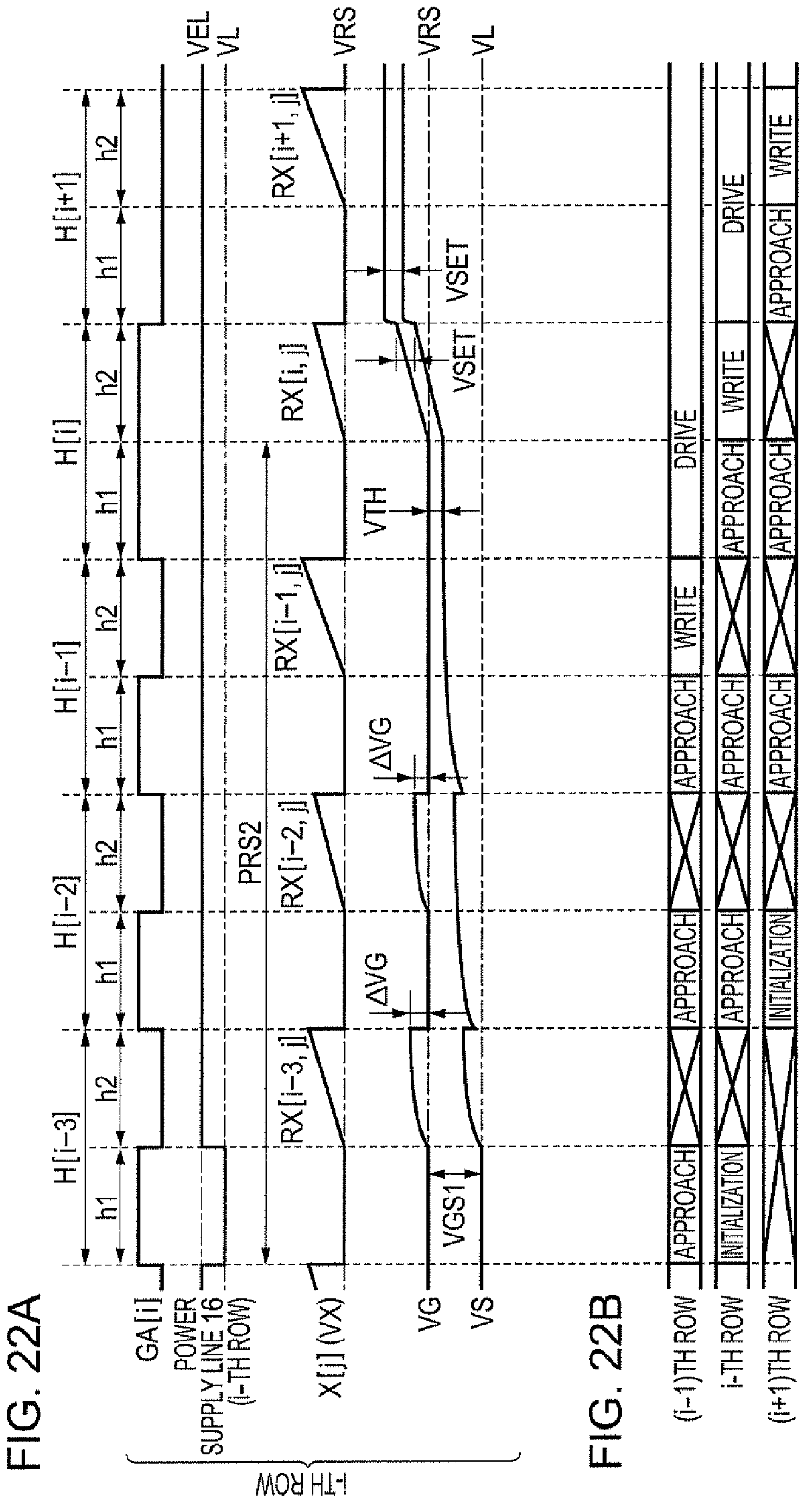
FIGS. 22A and 22B are timing charts illustrating the operation of a light emitting device according to a ninth embodiment of the invention.

FIGS. 22A and 22B are timing charts illustrating the operation of the light emitting device 100 according to the ninth embodiment of the invention. As illustrated in FIG. 22A, each of the plurality of unit time periods H ( . . . , H[i−3], H[i−2], H[i−1], H[i], H[i+1]), . . . ) is divided into period h1 and period h2. The period h1 is the first-half period of the unit time period H and the period h2 is the second-half period of the unit time period H.

As illustrated in FIG. 22A, during the period h2 of the unit time period H[i], the scanning line-driving circuit 32 sets the scanning signals GA[i] to the selection potential VSL, and the signal line-driving circuit 34 changes the potential VX of the respective driving signals X[j] with the time rate of change RX[i,j] corresponding to the specified gradation D of the pixel circuit U disposed on the i-th row and the j-th column.

As illustrated as "WRITE" in FIG. 22B, during the period h2 of the unit time period H[i], an operation (hereinafter, referred to as "writing operation") of setting the gate-source voltage VGS of the driving transistor TDR in each of the respective pixel circuits U on the i-th row to the voltage VSET corresponding to the time rate of change RX[i,j] of the potential VX of the driving signal X[j] is executed. As illustrated in FIG. 22B, the writing operation for the respective pixel circuits U is sequentially executed for every period h2 of the unit time period H on a row-by-row basis. The operation of supplying the driving current DR corresponding to the voltage VSET to the light emitting elements E after the passing of the unit time period H[i] is the same as that of the first embodiment.

As illustrated in FIG. 22B, the driving circuit 30 executes an operation (hereinafter, referred to as "initialization operation") of initializing the gate-source voltage VGS of the driving transistor TDR in each of the respective pixel circuits U on the i-th row to the voltage VGS1 using a plurality of unit time periods H (H[i−3] to H[i−1]) occurring before the unit time period H[i] as the initialization period PRS2 for the i-th row and also executes the approaching operation of causing the voltage VGS of the driving transistor TDR in each of the respective pixel circuits U on the i-th row to approach the threshold voltage VTH. A specific example of the operation will be described below with particular attention to the pixel circuit U disposed on the i-th row and the j-th column.

In the period h1 of each of the unit time periods H[i−3] to H[i], the scanning line-driving circuit 32 sets the scanning signals GA[i] on the i-th row to the selection potential VSL, and the signal line-driving circuit 34 sets the driving signals X (X[1] to X[n]) to the reference potential VRS. On the other hand, the potential control circuit 36 supplies the potential VL during the period h1 of the third previous unit time period H[i−3] of the unit time period H[i] to the power supply lines 16 on the i-th row while supplying the potential VEL during other periods. Therefore, the gate-source voltage VGS of the driving transistor TDR of each of the respective pixel circuits U on the i-th row is initialized to the voltage VGS 1 (VGS1=VRS−VL), at which the driving transistor TDR is changed to the ON state, by the initialization operation during the period h1 of the unit time period H[i−3].

When the period h1 of the unit time period H[i−3] has elapsed, the potential control circuit 36 changes the potential VL of the power supply lines 16 on the i-th row to the higher voltage VEL. Therefore, similar to the period P2 in the eighth embodiment, the approaching operation of causing the gate-source voltage VGS of the driving transistor TDR to approach to the threshold voltage VTH from the voltage VGS1 is executed. As illustrated in FIGS. 22A and 22B, the approaching operation is continuously executed from the period h2 of the unit time period H[i−3] to the period h1 of the unit time period H[i].

In the period h2 of each of the unit time periods H[i−3] to H[i−1] the select switch TSL is controlled to be in the OFF state, so that the gate of the driving transistor TDR is held in an electrically floating state. Therefore, when the source potential VS is varied over time by the charging, by the current IDS, of the capacitor CE or the storage capacitor CST, the gate potential VG of the driving transistor TDR is changed with the potential VS by the amount of variation ΔVG within the period h2, as illustrated in FIGS. 22A and 22B. On the other hand, at the starting point of the period h1 in each of the unit time periods H[i−2] to H[i], the gate potential VG of the driving transistor TDR drops from the increased potential in the previous period h2 to the reference potential VRS of the signal lines 14 by the amount of variation ΔVG. Since the storage capacitor CST is disposed between the gate and the source of the driving transistor TDR, the source potential VS is decreased with the potential VG at the starting point of the period h1. The amount of variation of the potential VS is a voltage obtained by dividing the amount of variation ΔVG of the potential VG by the capacitance ratio between the capacitor CE and the storage capacitor CST (that is, the potential VS is changed only by the voltage smaller than the voltage of variation of the potential VG). Moreover, since the variation of the potential VS is suppressed as the voltage VGS of the driving transistor TDR approaches the threshold voltage VTH, the amount of variation ΔVG of the potential VG within the period h2 decreases over time. Therefore, the gate-source voltage VGS of the driving transistor TDR approaches, over time, the threshold voltage VTH while increasing at the starting point of the period h1 in each of the unit time periods H[i−2] to H[i].

The number of unit time periods H during which the approaching operation is executed is chosen so that the voltage VGS sufficiently approaches (ideally, becomes identical to) the threshold voltage VTH. Therefore, in the period h2 of the unit time period H[i], the writing operation is started in a state where the gate-source voltage VGS of the driving transistor TDR is set to the threshold voltage VTH.

In the above-mentioned embodiment, since the approaching operation is executed over a plurality of unit time periods H, compared with the eighth embodiment where the approaching operation is completed within one unit time period H, it is possible to provide an advantage that, even when the length of the unit time period H is short, the approaching operations can be performed sufficiently longer so that the voltage VGS of the driving transistor TDR approaches sufficiently close to the threshold voltage VTH.

D-6: Tenth Embodiment

Figure 23:
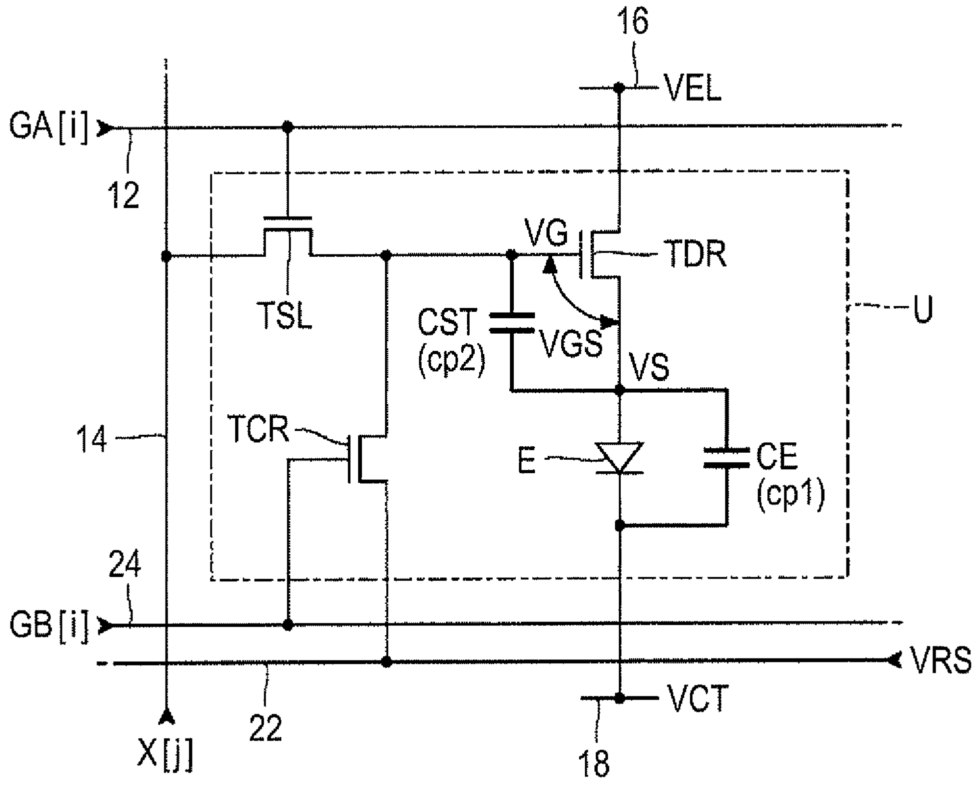
FIG. 23 is a circuit diagram of a pixel circuit according to a tenth embodiment of the invention.

FIG. 23 is a circuit diagram of a pixel circuit U according to a tenth embodiment of the invention. As illustrated in FIG. 23, the pixel circuit U corresponds to a configuration in which a control switch TCR is added to the pixel circuit U according to the above-mentioned embodiments. The control switch TCR is an N-channel transistor (for example, a thin-film transistor) that is disposed between the gate of the driving transistor TDR and a power supply line 22 so as to control an electrical connection (conduction/non-conduction) between them. The power supply line 22 is supplied with the reference potential VRS from a power supply circuit (not illustrated). In the eighth or ninth embodiment, the signal line 14 for supplying the driving signal X[j] is used for supplying the reference potential VRS to the pixel circuit U during execution of the initialization operation. However, in the present embodiment, the power supply line 22 that is provided to be separate from the signal line 14 is used for supplying the reference potential VRS during the initialization operation.

In the device portion 10, μ control lines 24 extending in the X direction together with the scanning lines 12 are formed. As illustrated in FIG. 23, the gate of the control switch TCR in each of the respective pixel circuits U on the i-th row is connected to the control line 24 on the i-th row. The respective control lines 24 are supplied with control signals GB (GB[1] to GB[m]) from the driving circuit 30 (for example the scanning line-driving circuit 32).

Figure 24:
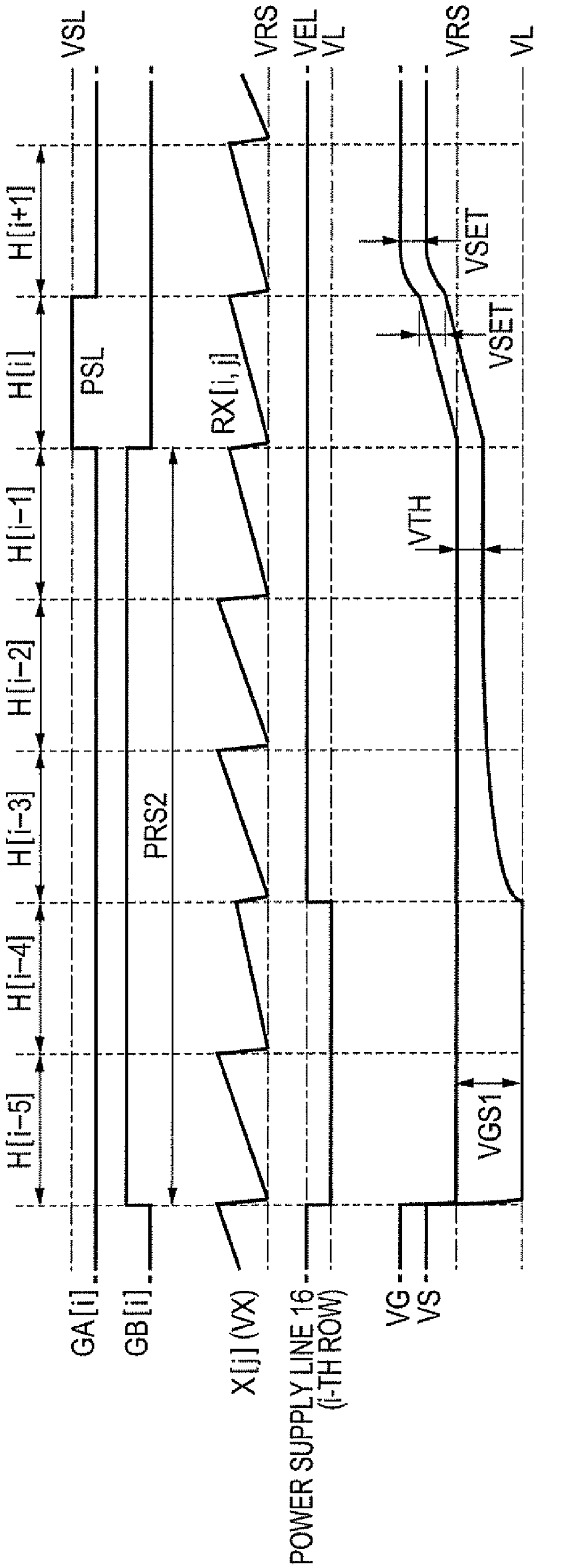
FIG. 24 is a timing chart illustrating the operation of a light emitting device according to the tenth embodiment.

FIG. 24 is a timing chart illustrating the operation of driving the pixel circuit U. As illustrated in FIG. 24, in the unit time period H[i], the scanning line-driving circuit 32 sets the scanning signal GA[i] to the selection potential VSL, and the signal line-driving circuit 34 changes the potential VX of the driving signal X[j] with the time rate of change RX[i,j] corresponding to the specified gradation D of the pixel circuit U disposed on the i-th row and the j-th column. Therefore, similar to the case of the firth embodiment, the writing operation of setting the voltage VGS of the respective driving transistors TDR on the i-th row to the potential VSET corresponding to the specified gradation D is executed in the unit time period H[i], and the driving current IDR is supplied to the light emitting element E at the point in time occurring after the passing of the unit time period H[i]. On the other hand, the initialization operation and the approaching operation for the respective pixel circuits U on the i-th row are executed using a plurality of unit time periods H (unit time periods H[i−5] to H[i−1]) occurring before the unit time period H[i] as the initialization period PRS2. More specifically, the initialization operation for the i-th row is executed during the unit time periods H[i−5] and H[i−4], and the approaching operation for the i-th row is executed during the unit time periods H[i−3] to H[i−1].

The control signal GB[i] is set to an active level (high level) over the unit time periods H[i−5] to H[i−1] and is maintained at a non-active level during other periods. When the control signal GB[i] transitions to the active level, the control switch TCR in each of the respective pixel circuits U on the i-th row is changed to the ON state. Therefore, the reference potential VRS is supplied from the power supply line 22 via the control switch TCR to the gate of the driving transistor TDR.

The potential control circuit 36 supplies the potential VL to the power supply line 16 on the i-th row during the unit time periods H[i−5] and H[i−4]. Since the gate of the driving transistor TDR is supplied with the reference potential VRS from the power supply line 22, the initialization operation of setting the voltage VGS of the driving transistor TDR in each of the respective pixel circuits U on the i-th row to the voltage VGS1 (VGS1=VRS−VL) is executed during the unit time periods H[i−5] and H[i−4].

When the unit time period H[i−4] has elapsed, the potential control circuit 36 changes the potential VL of the power supply line 16 on the i-th row to a higher potential VEL. On the other hand, since the gate of the driving transistor TDR is continuously supplied with the reference potential VRS, similar to the period P2 in the eighth embodiment, the approaching operation of causing the gate-source voltage VGS of the driving transistor TDR to approach the threshold voltage VTH is executed. As illustrated in FIG. 24, the approaching operation for the i-th row is continued from the starting point of the unit time period H[i−3] to the end point of the unit time period H[i−1] at which the control signal GB[i] transitions to the non-active level. The number (in this embodiment, three) of unit time periods H during which the approaching operation is executed is chosen so that the voltage VGS sufficiently approaches (ideally, becomes identical to) the threshold voltage VTH. Therefore, similar to the case of the ninth embodiment, in the unit time period H[i], the writing operation is started in a state where the gate-source voltage VGS of the driving transistor TDR is set to the threshold voltage VTH.

In the above-mentioned embodiment, since the approaching operation is executed over a plurality of unit time periods H, compared with the eighth embodiment where the approaching operation is completed within one unit time period H, it is possible to provide an advantage that, even when the length of the unit time period H is short, the approaching operations can be performed sufficiently longer so that the voltage VGS of the driving transistor TDR approaches sufficiently close to the threshold voltage VTH.

In the ninth embodiment, the gate potential VG of the driving transistor TDR varies with the source potential VS during the respective periods h2, during which the approaching operation is performed, and is set to the reference potential VRS during the respective periods h1. Therefore, at the starting point of the respective periods h1, during which the approaching operation is performed, as described above with reference to FIGS. 22A and 22B, the gate potential VG of the driving transistor TDR is decreased, so that the gate-source voltage VGS is increased in a discontinuous manner. On the other hand, in the present embodiment, during the approaching operation, since the gate potential VG of the driving transistor TDR is fixed at the reference potential VRS, as illustrated in FIG. 24, the gate-source voltage VGS approaches the threshold voltage VTH in a continuous manner during the approaching operation (that is, the voltage VGS does not increase in the course of the approaching operation). Therefore, it is possible to provide an advantage that the number of unit time periods H necessary for the approaching operation can be reduced compared with the ninth embodiment. Moreover, it is possible to provide another advantage that a sufficiently high brightness of display images can be achieved because the length of the emission period of the light emitting element E can be increased by the amount corresponding to the decrease in the number of unit time periods H for the approaching operation. Nevertheless, the ninth embodiment can provide an advantage that the internal configuration of the device portion 10 can be simplified (namely, the number of lines can be reduced) compared with the tenth embodiment, because the common signal line 14 is shared for both the supply of the reference potential VRS for the initialization operation and the supply of the driving signal X[j] for the writing operation.

D-7: Other Embodiments

The fifth to tenth embodiments illustrate the case where the initialization of the voltage VGS is added to the first embodiment where the driving signal X[j] illustrated in FIG. 6 is used. However, a configuration in which the same initialization (initialization operation and approaching operation) as that of the fifth to tenth embodiments is executed may be preferably employed in the second to fourth embodiments where the driving signal X[j] illustrated in FIGS. 12 to 14 (the second to fourth embodiments) is used.

For example, it may be desirable to have a configuration in which the gate-source voltage VGS of the driving transistor TDR is set to the threshold voltage VTH by the approaching operation similar to the case of the eighth to tenth embodiments, and thereafter, as described as the fourth embodiment in FIG. 14, the potential VX of the driving signal X[j] is changed to the adjustment potential VA and is then varied with the time rate of change RX.

The storage capacitor CST is disposed between the gate and the source of the driving transistor TDR. Therefore, when the potential VX of the driving signal X[j] is changed at the point in time tA2 from the reference potential VRS to the adjustment potential VA by the amount of variation ΔV (ΔV=VA−VRS) as depicted by the solid line in FIG. 15, the source potential VS of the driving transistor TDR is changed (increased) by the voltage (ΔV·cp2/(cp1+cp2)) which is obtained by dividing the amount of variation ΔV of the potential VG by the capacitance ratio between the storage capacitor CST and the capacitor CE. At this time, if it is assumed that the gate-source voltage VGS of the driving transistor TDR before arrival of the point in time tA2 is set to the threshold voltage VTH by the approaching operation of the eighth to tenth embodiments, the voltage VGS of the driving transistor TDR immediately after the point in time tA2 can be expressed by Equation 5 below.

$$VGS=VTH-\Delta V\cdot cp1/(cp1+cp2) \quad \text{Equation 5}$$

By substituting the voltage VGS given by Equation 5 into Equation 1, it is possible to derive Equation 6 expressing the current IDS flowing between the drain and the source of the driving transistor TDR immediately after the point in time tA2. In Equation 6, the term "1/2·ρ·W/L·Cox" in Equation 1 is substituted with a coefficient K for the convenience's sake. Since the coefficient K of the respective driving transistors TDR may have variations due to variations in the mobility; μ, a typical value (for example, the average) of the coefficient K of the respective driving transistors TDR is used as the actual coefficient K.

$$IDS = 1/2\cdot\mu\cdot\frac{W}{L}\cdot Cox\cdot\{\Delta V\cdot cp1/(cp1+cp2)\}^2 = K\cdot\{\Delta V\cdot cp1/(cp1+cp2)\}^2 \quad \text{Equation 6}$$

Therefore, in order for the current IDS immediately after the point in time tA2 to be adjusted to the target value la corresponding to the specified gradation D, it is necessary to set the difference ΔV between the adjustment potential VA and the reference potential VRS so as to satisfy the relationship of Equation 7 below. By setting the adjustment potential VA with respect to the reference potential VRS so as to satisfy the relationship of Equation 7 in accordance with the specified gradation D, it is possible to cause the driving transistor TDR to quickly reach the equilibrium state.

$$\Delta V=VA-VRS=\{(cp1+cp2)/cp1\}\cdot(Ia/K)^{1/2} \quad \text{Equation 7}$$

Although in the sixth to tenth embodiments, the gate potential VG of the driving transistor TDR was initialized to the reference potential VRS of the driving signal X[j], a configuration may be employed in which the potential VG is initialized to a predetermined potential independent of the driving signal X[j]. Moreover, although in the eighth to tenth embodiments, the gate-source voltage VGS of the driving transistor TDR was set to the threshold voltage VTH by the approaching operation, it is not necessary to cause the voltage VGS to approach directly to the threshold voltage VTH. That is to say, it is desirable to have a configuration in which the voltage VGS of the driving transistor TDR is caused to approach from the voltage VGS1 set by the initialization operation to the threshold voltage VTH by the approaching operation.

E: Modifications

The above-described embodiments can be modified in various ways. Specific examples of modifications of the embodiments will be described. Two or more modifications may be chosen arbitrarily from the examples below and be combined with each other.

(1) Modification 1

Figure 25:
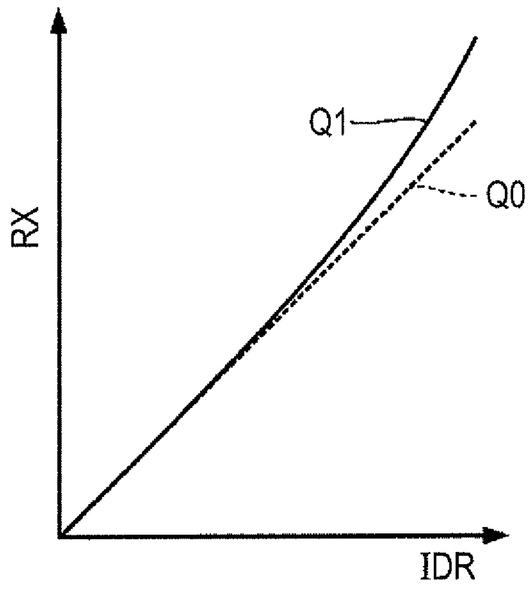
FIG. 25 is a graph illustrating the relationship between a driving current and the time rate of change of the potential of a driving signal.
Figure 26:
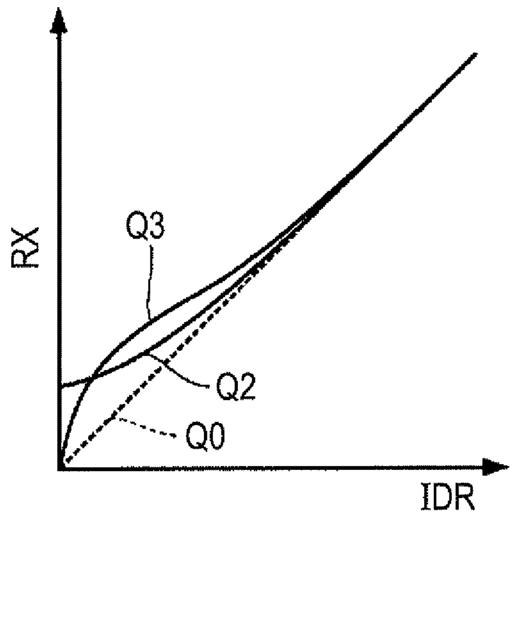
FIG. 26 is a graph illustrating the relationship between a driving current and the time rate of change of the potential of a driving signal.

In the above-mentioned embodiments, as illustrated by the curves Q0 (broken lines) in FIGS. 25 and 26, the time rate of change RX of the potential VX of the driving signal X[j] is set to a time rate of change RX corresponding to the specified gradation D so as to be proportional to the current IDS (the driving current IDR) to be supplied to the light emitting element E (so that the relationship of Equation 3 is satisfied). That is to say, the time rate of change RX is set so that a multiplication of the time rate of change RX[i,j] of the potential VX of the driving signal X[j] at the end point of the unit time period H[i] and the capacitance cp1 of the capacitor CE associated with the source of the driving transistor TDR becomes identical to the target value of the driving current IDR. However, the relationship (proportional relationship) of Equation 3 may not be strictly satisfied between the driving current IDS and the time rate of change RX.

For example, due to the feed-through effect when the gate potential of the select switch TSL is lowered in order to cause the select switch TSL to be changed to the OFF state, the gate potential VG of the driving transistor TDR may vary (decrease) at the end point te of the unit time period H. Moreover, the amount of variation of the potential VG may differ depending on the specified gradation D (for example, depending on the time rate of change RX of the potential VX of the driving signal X[j] or the potential VX at the end point te of the unit time period H[i]). Therefore, it may be desirable to have a configuration in which the relationship between the driving current DS and the time rate of change RX is chosen so that the difference in the amount of variation of the potential VG due to the feed-through effect can be compensated for.

For instance, if the amount of decrease in the potential VG due to the feed-through effect increases as the specified gradation D increases (i.e., as the driving current IDR increases), the time rate of change RX with respect to the driving current IDR of the respective specified gradations D is chosen as depicted by the curve Q1 in FIG. 25 so that the rate of change (gradient) of the time rate of change RX with respect to the driving current IDR increases as the driving current IDR increases. On the other hand, if the amount of decrease in the potential VG increases as the specified gradation D decreases (i.e., as the driving current DR decreases), the time rate of change RX with respect to the driving current DR of the respective specified gradations D is chosen as depicted by the curve Q2 or Q3 in FIG. 26 so that the rate of change (gradient) of the time rate of change RX with respect to the driving current IDR increases as the driving current IDR decreases.

When the time rate of change RX of the potential VX of the driving signal X[j] is low (i.e., the specified gradation D has a low gradation), an extremely long period of time may be required for the driving transistor TDR to reach the equilibrium state. Therefore, from the viewpoint of enabling the driving transistor TDR to quickly reach the equilibrium state even when the specified gradation D is a low gradation, it may be desirable to have a configuration in which the time rate of change RX with respect to the driving current IDR of the respective specified gradation D is chosen as depicted by the curve Q2 or Q3 in FIG. 26 so that the rate of change of the time rate of change RX with respect to the driving current IDR increases as the driving current DR decreases.

(2) Modification 2

The current amount of the driving current IDR supplied to the light emitting element E is determined depending on the time rate of change RX of the potential VX of the driving signal X[j] at the end point te of the unit time period H[i]. Therefore, it is desirable to have a configuration in which the time rate of change RX of the potential VX at the end point te (the point in time at which the supply of the driving signal X[j] to the gate of the driving transistor TDR stops) of the unit time period H[i] during the driving signal X[j] is set in accordance with the specified gradation D. However, in the invention, the waveform (the time rate of change RX) of the driving signal X[j] during the unit time period H[i] is not particularly limited. However, in order to make the time rate of change RS of the source potential VS of the driving transistor TDR exactly identical to the time rate of change RX of the potential VX of the driving signal X[j] at the end point te of the unit time period H[i], it is particularly desirable to have a configuration in which the time rate of change RX of the driving signal X[j] is continuously fixed at a constant value corresponding to the specified gradation D over a predetermined period of time until the end point te.

(3) Modification 3

In the fifth to tenth embodiments, the starting timings or the triggering signals of the operation of initializing the gate-source voltage VGS of the driving transistor TDR are changed arbitrarily. For example, a configuration where the initialization operation or the approaching operation is executed once for every a plurality of vertical scanning periods, or a configuration where the initialization operation or the approaching operation is executed in response to instructions, as the triggering signals, from the user issued to the light emitting device 100 may be employed. The configuration (the seventh to tenth embodiments) where the voltage VGS of the driving transistor TDR is initialized for every unit time period H is particularly desirable when the specified gradation D varies over time (that is, when moving pictures are displayed). Therefore, a configuration may be employed in which, when moving pictures are displayed, the voltage VGS is frequently initialized during driving (the initialization period PRS2) of the pixel circuit U, while, when still images are displayed, the voltage VGS is initialized only immediately after (during the initialization period PRS1) the light emitting device 100 is powered on.

(4) Modification 4

Figure 27:
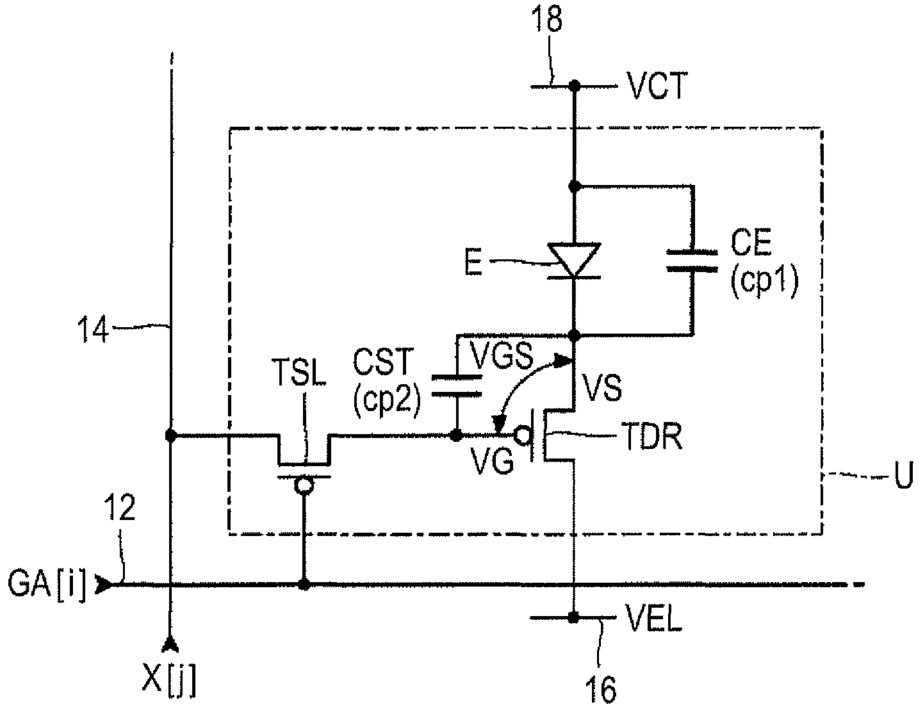
FIG. 27 is a circuit diagram of a pixel circuit according to a modification.

The conduction types of the respective transistors (the driving transistor TDR, the select switch TSL, and the control switch TCR) constituting the pixel circuit U are arbitrary. For example, a configuration as illustrated in FIG. 27 may be employed in which the driving transistor TDR and the respective switches (the select switch TSL and the control switch TCR) are formed of P-channel transistors. In the pixel circuit U illustrated in FIG. 27, the anode of the light emitting element E is connected to the power supply line 18 (at potential VCT), and the driving transistor TDR has a drain thereof being connected to the power supply line 16 (at potential VEL) and a source thereof being connected to the cathode of the light emitting element E. The configuration where the storage capacitor CST is disposed between the gate and the source of the driving transistor TDR and the configuration where the select switch TSL is disposed between the gate of the driving transistor TDR and the signal line 14 are the same as those illustrated in FIG. 4. When the P-channel driving transistor TDR is employed as described above, the relationship (amplitude relationship) of voltage is opposite to the case of employing the N-channel driving transistor TDR. However, the essential operations are similar to those of the above-described embodiments, and detailed description of the operations will be omitted.

(5) Modification 5

Figure 28:
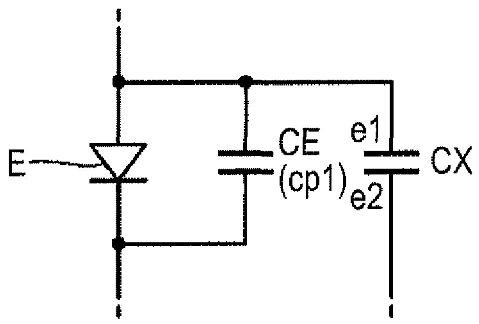
FIG. 28 is a circuit diagram of a part of the pixel circuit according to a modification.

Although in the above-described embodiments, the capacitor CE associated with the light emitting element E was used, it is also desirable to have a configuration where a capacitor CX formed separately from the light emitting element E is used together with the capacitor CE, as illustrated in FIG. 28. An electrode e1 of the capacitor CX is connected to a path (the source of the driving transistor TDR) that connects the driving transistor TDR and the light emitting element E. An electrode e2 of the capacitor CX is connected to a line to which a predetermined potential is supplied (for example, the power supply line 18 supplied with the potential VCT or the power supply line 22 in FIG. 23, supplied with the reference potential VRS). In the configuration illustrated in FIG. 28, the capacitance cp1 in the above-described embodiments corresponds to the sum of the capacitance of the capacitor CX and the capacitance of the capacitor CE of the light emitting element E. Therefore, it is possible to appropriately adjust the current DS (and the driving current IDR) given by Equation 2 or 3 in accordance with the capacitance of the capacitor CX. In the configuration of forming the capacitor CX, the presence of the capacitor CE in the light emitting element E and the magnitude of the capacitance thereof are not particularly limited. That is to say, a configuration where the capacitor CE is not associated with the light emitting element E and a configuration where the capacitance thereof is sufficiently small may be employed.

(6) Modification 6

Similar to the case of the above-described embodiments, when the respective pixel circuits U are driven on a row-by-row basis based on time division multiplexing in the configuration where a plurality of pixel circuits U is arranged in matrix, it is necessary to have the select switch TSL in the respective pixel circuits U. However, in a configuration where a plurality of pixel circuits U is arranged in one column along the X direction, for example, since the operation of selecting a plurality of rows by the time division multiplexing is not required, the select switch TSL in the pixel circuits U is not necessary. The light emitting device 100 in which a plurality of pixel circuits U is arranged in only one column is desirably employed as an exposure device that exposes an image carrier such as a photosensitive drum in an electrophotographic image forming apparatus (a printing apparatus), for example.

(7) Modification 7

An organic EL element is merely an example of the light emitting element. For example, similar to the above-described embodiments, the invention is applicable to a light emitting device in which light emitting elements such as inorganic EL elements or light emitting diode (LED) elements are arranged. The light emitting element used in the invention is a current-driven element which is driven by a current supplied thereto (typically, a gradation (luminance) is controlled).

F: Applications

Figure 29:
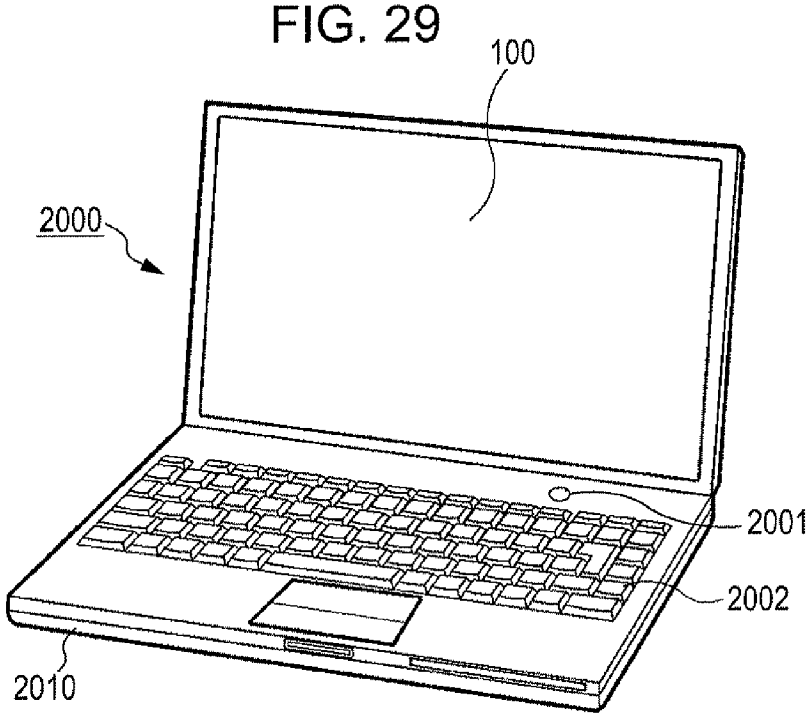
FIG. 29 is a perspective view of an electronic apparatus (personal computer)
Figure 30:
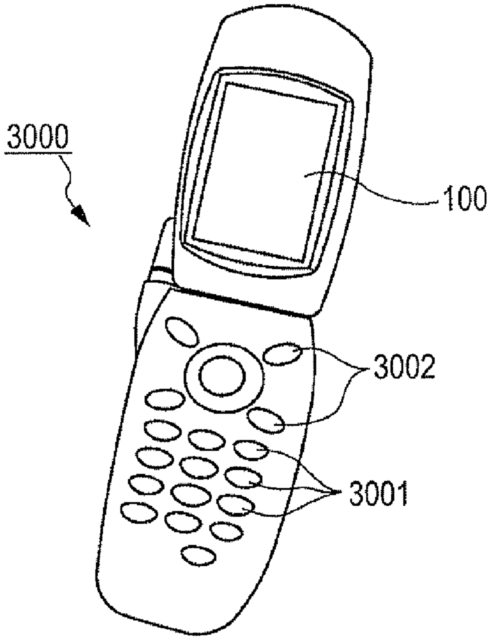
FIG. 30 is a perspective view of an electronic apparatus (cellular phone)
Figure 31:
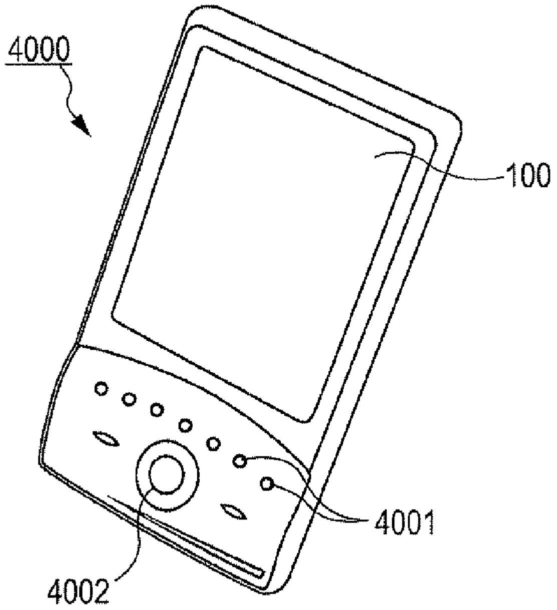
FIG. 31 is a perspective view of an electronic apparatus (personal digital assistant).

Next, an electronic apparatus that utilizes the light emitting device 100 according to the above-described embodiments will be described, FIGS. 29 to 31 illustrate embodiments of an electronic apparatus in which the light emitting device 100 is employed as a display device.

FIG. 29 is a perspective view of a mobile personal computer that utilizes the light emitting device 100. A personal computer 2000 includes the light emitting device 100 for displaying various images and a main unit 2010 on which a power switch 2001 and a keyboard 2002 are provided. Because the light emitting device 100 uses an organic EL element as the light emitting element E, the light emitting device 100 can display an easily visible screen with a wide viewing angle.

FIG. 30 is a perspective view illustrating the configuration of a cellular phone to which the light emitting device 100 is applied. A cellular phone 3000 includes a plurality of control buttons 3001, a plurality of scroll buttons 3002, and the light emitting device 100 for displaying various images. By controlling the scroll buttons 3002, a screen displayed on the light emitting device 100 is scrolled.

FIG. 31 is a perspective view illustrating the configuration of a personal digital assistant (PDA) to which the light emitting device 100 is applied. A PDA 4000 includes a plurality of control buttons 4001, a power switch 4002, and the light emitting device 100 for displaying various images. When the power switch 4002 is controlled, various types of information, such as an address book or a schedule book, are displayed on the light emitting device 100.

Examples of the electronic apparatus to which the light emitting device 100 according to an embodiment of the invention is applied include the electronic apparatuses illustrated in FIGS. 29 to 31. Additionally, the examples include, for example, a digital still camera, a television set, a video camera, a car navigation system, a pager, a digital diary, an electronic paper, a calculator, a word processor, a workstation, a videophone, a point-of-sales (POS) terminal, a printer, a scanner, a copier, a video player, and an apparatus provided with a touch panel. Furthermore, the application of the light emitting device 100 according to an embodiment of the invention is not limited to displaying of images. For example, the light emitting device 100 according to an embodiment of the invention can be utilized as an exposure device that forms, by exposure, latent images on a photosensitive drum in an electrophotographic image forming apparatus.

What is claimed is:

1. A method of driving a pixel circuit that includes a current-driven element connected in series with a driving transistor, a storage capacitor disposed between a path between the current-driven element and the driving transistor and a gate of the driving transistor, and a select switch disposed between a signal line that supplies a driving signal and the gate of the driving transistor, the method comprising:

supplying the driving signal to the select switch;

changing a potential of the driving signal over time to have a constant time rate of change over a unit time period, the time rate of change corresponding to a specified gradation of the pixel circuit by starting to change the potential of the driving signal with the time rate of change corresponding to the specified gradation after the passing of an adjustment time from the leading edge of the selection pulse;

setting the adjustment time to be variable in accordance with the specified gradation; and controlling the select switch to be in an ON state in response to supply of a selection pulse, so that the driving signal is supplied from the signal line to the gate of the driving transistor.

2. The pixel circuit driving method according to claim 1, further comprising:

setting an open circuit voltage of the storage capacitor by setting a capacitance of a capacitor associated with the path between the current-driven element and the driving transistor to allow a current to flow through the driving transistor that corresponds to a multiplication of the time rate of change of the potential of the driving signal at a point in time when the supply of the driving signal to the gate of the driving transistor stops.

3. The pixel circuit driving method according to claim 1, further comprising:

changing the potential of the driving signal with the time rate of change corresponding to the specified gradation during a predetermined period of time prior to a point in time when the supply of the driving signal to the gate of the driving transistor stops.

4. The pixel circuit driving method according to claim 1, further comprising:

changing the select switch to an OFF state at a trailing edge of the selection pulse, when the specified gradation is a first gradation, so that the supply of the driving signal to the gate of the driving transistor stops.

5. The pixel circuit driving method according to claim 1, further comprising:

changing the potential of the driving signal and the potential of the selection pulse, when the specified gradation is a second gradation, so that a difference in potential between the driving signal and the selection pulse is lower than a threshold voltage of the select switch so that the select switch enters into an OFF state at an earlier point in time than a trailing edge of the selection pulse.

6. The pixel circuit driving method according to claim 1, further comprising:

changing the potential of the driving signal with the time rate of change corresponding to the specified gradation after changing the potential to an adjustment potential corresponding to the specified gradation.

7. The pixel circuit driving method according to claim 1, the current-driven element being a light emitting element.

8. A light emitting device comprising:

a pixel circuit comprising:

a current-driven element;

a driving transistor connected in series with the current-driven element;

a storage capacitor disposed between a path between the current-driven element and the driving transistor and a gate of the driving transistor; and a select switch disposed between a signal line that supplies a driving signal to the gate of the driving transistor; and a driving circuit configured to supply the driving signal to the select switch and to change a potential of the driving signal over time to have a constant time rate of change over a unit time period, the time rate of change corresponding to a specified gradation of the pixel circuit, the driving circuit starting to change the potential of the driving signal with the time rate of change corresponding to the specified gradation after the passing of an adjustment time from the leading edge of the selection pulse, the driving circuit setting the adjustment time to be variable in accordance with the specified gradation and controlling the select switch to be in an ON state in response to supply of a selection pulse, so that the driving signal is supplied from the signal line to the gate of the driving transistor.

9. The light emitting device according to claim 8, the driving circuit further comprising:

a potential selecting portion that selects any one of a plurality of potentials, each of the plurality of potentials associated with a specified gradation of the pixel circuit;

a current generating portion that generates a current corresponding to the potential selected by the potential selecting portion; and a capacitive element that is charged by supply of the current generated by the current generating portion, the voltage of the capacitive element being output as the driving signal.

10. The light emitting device according to claim 8, the driving circuit further comprising:

a plurality of signal generation portions that generate a plurality of signals of which the potentials have different time rates of change; and a signal selecting portion that selects any one of the plurality of signals in accordance with the specified gradation as the driving signal.

11. The light emitting device according to claim 8, the current-driven element being a light emitting element.

12. A driving circuit that supplies a driving signal to a gate of a driving transistor of a pixel circuit and that changes a potential of the driving signal over time to have a constant time rate of change over a unit time period, the time rate of change corresponding to a specified gradation of the pixel circuit, the driving circuit comprising:

a voltage generating portion that generates a number of potentials corresponding to a total number of gradations supported by the pixel circuit;

a plurality of signal generation portions that generate a plurality of driving signals, each of the plurality of driving signals based on a selected one of the potentials generated by the voltage generating portion, and each of the plurality of driving signals having a different potential time rate of change;

a signal selecting portion that selects any one of the plurality of driving signals in accordance with a specified gradation as the driving signal;

a potential selecting portion that selects any one of the plurality of potentials generated by the voltage generation portion, each of the plurality of potentials associated with a specified gradation of the pixel circuit;

a current generating portion that generates a current corresponding to the potential selected by the potential selecting portion;

a waveform generating portion that generates the driving signal with a potential that changes with a time rate of change based on the current generated by the current generating portion;

a capacitive element that is charged by a supply of the current generated by the current generating portion;

a switch configured in parallel with the capacitive element that is temporarily closed to initialize a potential across the capacitive element to a reference potential; and a buffer that supplies the potential across the capacitive element on a signal line as a driving signal.

* * * * *